United States Patent
Wilczynski et al.

(10) Patent No.: US 12,450,265 B2
(45) Date of Patent: *Oct. 21, 2025

(54) SYSTEMS AND METHODS FOR PROCESSING AND DISPLAYING TIME-RELATED GEOSPATIAL DATA

(71) Applicant: Palantir Technologies Inc., Denver, CO (US)

(72) Inventors: Peter Wilczynski, San Francisco, CA (US); Daniel Zangri, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,694

(22) Filed: Oct. 23, 2023

(65) Prior Publication Data
US 2024/0045891 A1    Feb. 8, 2024

Related U.S. Application Data

(63) Continuation of application No. 17/583,474, filed on Jan. 25, 2022, now Pat. No. 11,829,392, which is a (Continued)

(51) Int. Cl.
*G06F 16/29*    (2019.01)
*G06F 3/0484*    (2022.01)
*G06F 3/04847*    (2022.01)

(52) U.S. Cl.
CPC .......... *G06F 16/29* (2019.01); *G06F 3/04847* (2013.01); *G06F 3/0484* (2013.01); *G06F 2203/04806* (2013.01)

(58) Field of Classification Search
CPC .... G06F 16/29; G06F 3/04847; G06F 3/0484; G06F 2203/04806
(Continued)

(56) References Cited

U.S. PATENT DOCUMENTS 6,484,179 B1 *  11/2002  Roccaforte ............. G06F 16/30
                                                        707/737
6,829,063 B1 *  12/2004  Allebach .................. H04N 1/52
                                                        358/3.13
(Continued)

FOREIGN PATENT DOCUMENTS

WO    2008128133 A1    10/2008

OTHER PUBLICATIONS

United States Patent and Trademark Office, Official Communication for U.S. Appl. No. 15/666,368, dated Feb. 27, 2018.
(Continued)

*Primary Examiner* — Cam Linh T Nguyen
(74) *Attorney, Agent, or Firm* — Faegre Drinker Biddle & Reath LLP—Palantir

(57) ABSTRACT

System and method for processing time-related geospatial data from one or more data sources. For example, a system includes an application server; and a storage. The application server is configured to: receive data including temporal information and geospatial information for each data object of one or more data objects, send the data to a client device to display the data on a map, and generate one or more first multi-dimensional tiles based at least in part on the temporal information and the geospatial information. The one or more first multi-dimensional tiles correspond to a temporal dimension associated with a first temporal width. The application server is further configured to send the one or more first multi-dimensional tiles to store in the storage for retrieval by the client device.

20 Claims, 8 Drawing Sheets

Related U.S. Application Data continuation of application No. 16/510,292, filed on Jul. 12, 2019, now Pat. No. 11,263,246, which is a continuation of application No. 16/248,689, filed on Jan. 15, 2019, now Pat. No. 10,394,859.

(60) Provisional application No. 62/748,143, filed on Oct. 19, 2018.

(58) Field of Classification Search
USPC .......................................................... 707/769
See application file for complete search history.

(56) References Cited

U.S. PATENT DOCUMENTS

| | | | |
|---|---|---|---|
| 8,655,073 B2* | 2/2014 | Sample | G09B 29/003 382/173 |
| 9,009,610 B2 | 4/2015 | Florance et al. | |
| 10,394,859 B1 | 8/2019 | Wilczynski et al. | |
| 11,263,246 B2 | 3/2022 | Wilczynski et al. | |
| 11,829,392 B2 | 11/2023 | Wilczynski et al. | |
| 2007/0229524 A1* | 10/2007 | Hendrey | G06F 3/0481 345/552 |
| 2008/0010273 A1 | 1/2008 | Frank | |
| 2008/0051994 A1 | 2/2008 | Fisher et al. | |
| 2009/0183083 A1* | 7/2009 | Hedges | G06F 3/04817 715/738 |
| 2009/0303251 A1 | 12/2009 | Balogh et al. | |
| 2010/0274674 A1* | 10/2010 | Roberts | H04N 5/445 705/14.73 |
| 2010/0305851 A1 | 12/2010 | Meyer et al. | |
| 2011/0207446 A1* | 8/2011 | Iwuchukwu | H04L 67/2852 455/414.3 |
| 2012/0178473 A1 | 7/2012 | Wiren et al. | |
| 2012/0218264 A1* | 8/2012 | Clarberg | G06T 13/80 345/420 |
| 2013/0208308 A1* | 8/2013 | Edgar | G06K 9/00483 358/1.15 |
| 2014/0011522 A1 | 1/2014 | Lin et al. | |
| 2014/0108419 A1* | 4/2014 | Udeshi | G06F 16/316 707/743 |
| 2014/0258281 A1* | 9/2014 | Chen | G06Q 10/10 707/724 |
| 2015/0095355 A1 | 4/2015 | Patton | |
| 2015/0109338 A1* | 4/2015 | McKinnon | G06F 16/5866 345/633 |
| 2015/0121772 A1* | 5/2015 | Berken | E04B 1/34331 52/28 |
| 2015/0161150 A1* | 6/2015 | Goering | G06F 16/29 707/743 |
| 2015/0356088 A1 | 12/2015 | Berkhin et al. | |
| 2016/0014480 A1* | 1/2016 | Maze | H04N 21/4728 725/116 |
| 2016/0061617 A1* | 3/2016 | Duggan | G06F 16/248 701/538 |
| 2016/0180060 A1 | 6/2016 | Nelson | |
| 2016/0253327 A1* | 9/2016 | Zhu | G06Q 30/0278 707/725 |
| 2016/0300375 A1* | 10/2016 | Beckett | G06T 3/4092 |
| 2017/0154116 A1* | 6/2017 | Zhou | G06Q 50/01 |
| 2017/0161863 A1* | 6/2017 | Baral | G06T 1/60 |
| 2018/0092087 A1* | 3/2018 | Zirwas | H04B 7/0417 |
| 2018/0276880 A1* | 9/2018 | VanderLugt | G06T 17/05 |
| 2019/0043201 A1* | 2/2019 | Strong | G06K 9/6228 |
| 2022/0147546 A1 | 5/2022 | Wilczynski et al. | |

OTHER PUBLICATIONS

United States Patent and Trademark Office, Official Communication for U.S. Appl. No. 15/666,368, dated Nov. 16, 2017.
United States Patent and Trademark Office, Official Communication for U.S. Appl. No. 15/788,043, dated Mar. 7, 2019.
United States Patent and Trademark Office, Official Communication for U.S. Appl. No. 15/788,043, dated Aug. 24, 2018.
United States Patent and Trademark Office, Official Communication for U.S. Appl. No. 15/788,043, dated Jan. 12, 2018.

* cited by examiner

SYSTEMS AND METHODS FOR PROCESSING AND DISPLAYING TIME-RELATED GEOSPATIAL DATA

CROSS REFERENCE TO RELATED APPLICATIONS

This application is a continuation of U.S. application Ser. No. 17/583,474, filed Jan. 25, 2022, which is a continuation of U.S. application Ser. No. 16/510,292 (now U.S. Pat. No. 11,263,246), filed Jul. 12, 2019, which is a continuation of U.S. application Ser. No. 16/248,689 (now U.S. Pat. No. 10,394,859), filed Jan. 15, 2019, which claims priority to U.S. Provisional Application No. 62/748,143, filed Oct. 19, 2018, all of which are incorporated by reference herein for all purposes.

BACKGROUND

Certain embodiments of the present invention are directed to data processing. More particularly, some embodiments of the present invention provide systems and methods for processing and displaying time-related geospatial data streamed from one or more data sources.

With the number of mobile devices and the amount of data provided by each device continuously increasing, the overall amount of data to be processed, stored and analyzed is also greatly increasing. A mapping application allows a user to visualize and interact with geospatial data through an interactive map. Since geospatial data is also typically very large in size, displaying the data significantly increases the system demand on input/output, bandwidth and processing time. For example, conventional mapping applications are inefficient and unable to process the increased amount of streamed data in addition to querying previously stored historic data with low latency.

Hence it is highly desirable to improve the techniques for processing and displaying geospatial data.

SUMMARY

Certain embodiments of the present invention are directed to data processing. More particularly, some embodiments of the present invention provide systems and methods for processing and displaying time-related geospatial data streamed from one or more data sources.

According to some embodiments, a system for processing time-related geospatial data from one or more data sources includes an application server and a storage. The application server is configured to: receive data including temporal information and geospatial information for each data object of one or more data objects, send the data to a client device to display the data on a map, and generate one or more first multi-dimensional tiles based at least in part on the temporal information and the geospatial information. The one or more first multi-dimensional tiles correspond to a temporal dimension associated with a first temporal width. The application server is further configured to send the one or more first multi-dimensional tiles to store in the storage for retrieval by the client device.

According to certain embodiments, a system for displaying time-related geospatial data from one or more data sources includes one or more processors and a memory storing instructions. The instructions, when executed by the one or more processors, cause the system to perform: receiving data including temporal information and geospatial information for each data object of one or more data objects, displaying the data on a map, and requesting one or more first multi-dimensional tiles corresponding to a temporal dimension associated with a first temporal width. The one or more first multi-dimensional tiles are generated based at least in part on the temporal information and the geospatial information and stored in a storage. The instructions, when executed by the one or more processors, cause the system to perform receiving the one or more first multi-dimensional tiles.

According to some embodiments, a method for displaying time-related geospatial data from one or more data sources includes: receiving data including temporal information and geospatial information for each data object of one or more data objects, displaying the data on a map, and requesting one or more first multi-dimensional tiles corresponding to a temporal dimension associated with a first temporal width. The one or more first multi-dimensional tiles are generated based at least in part on the temporal information and the geospatial information and stored in a storage. The method further includes receiving the one or more first multi-dimensional tiles. The method is performed using one or more processors.

Depending upon embodiment, one or more benefits may be achieved. These benefits and various additional objects, features and advantages of the present invention can be fully appreciated with reference to the detailed description and accompanying drawings that follow.

DETAILED DESCRIPTION

Conventional systems and methods are often not capable of efficiently processing and displaying such large amount of streamed data, including historic data, in real-time and without latency. Conventional systems and methods also typically lack the capability of displaying streamed data and historic data on an interactive map that allows temporal and spatial zooming in real-time and without latency.

In some embodiments, benefits include significant improvements, including, for example, increased efficiency and speed, in processing and displaying time-related geospatial streamed data as compared to conventional systems and methods. In certain embodiments, systems and methods are configured to process and display, in real time and without latency, large amount of streamed data and historic data, from, for example, millions of data sources. In some embodiments, systems and methods are configured to display streamed data and historic data on an interactive map that allows temporal and spatial zooming in real-time and without latency.

In certain embodiments, one or more solutions rooted in computer technology overcome one or more problems specifically arising in the realm of computer technology. Some embodiments are directed to data processing. More particularly, some embodiments provide systems and methods for processing and displaying time-related geospatial data. In some examples, the data includes data that is streamed from one or more data sources. In certain examples, geospatial data includes data associated with particular locations. According to some embodiments, the systems and methods include processing and storing time-related geospatial data by using temporal tiles and multidimensional line simplification.

Figure 1:
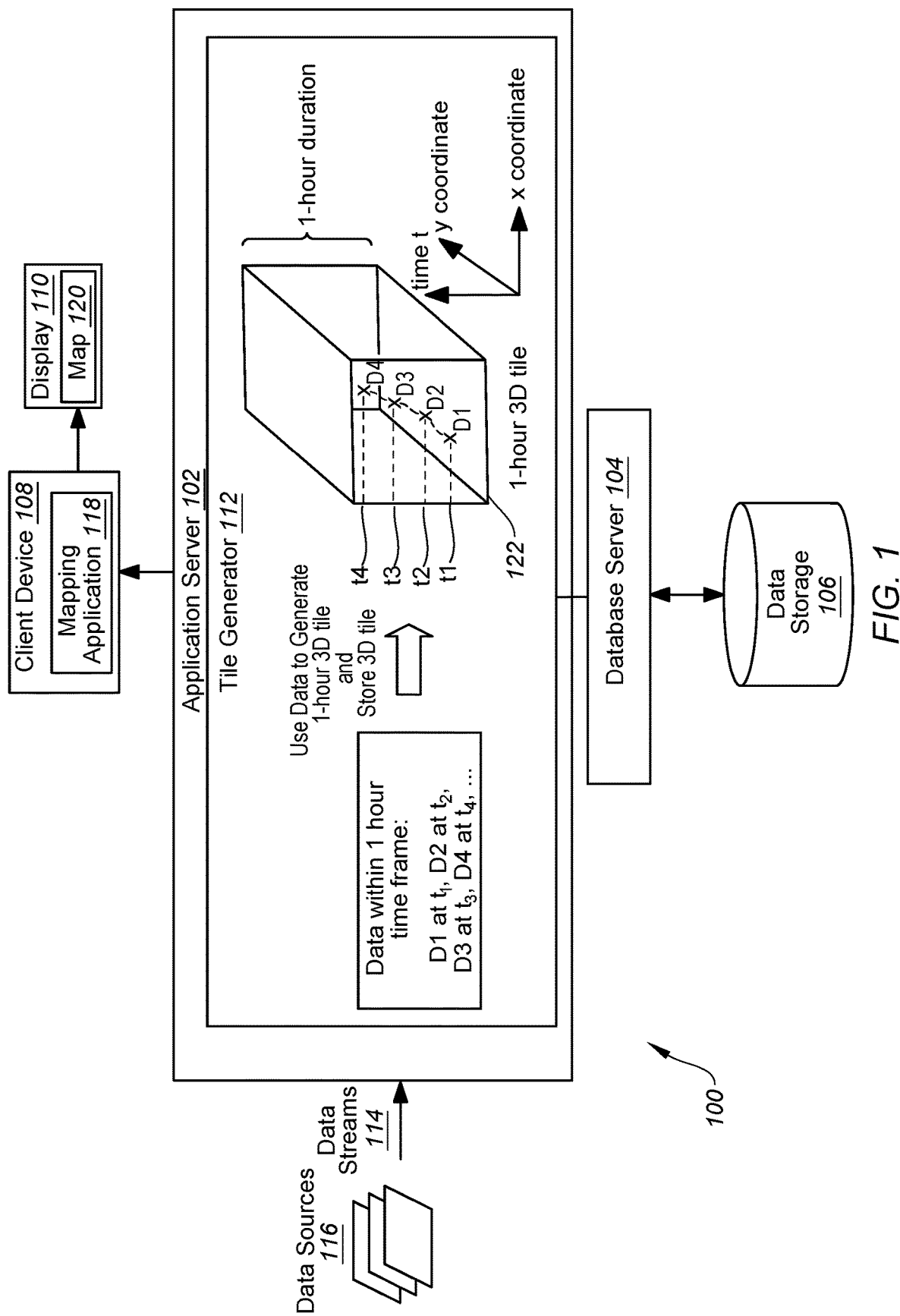
FIG. 1 is a simplified diagram showing a system for processing a data stream of map data according to one embodiment of the present invention.

FIG. 1 is a simplified diagram showing a system 100 for processing and displaying time-related geospatial data according to one embodiment of the present invention. This diagram is merely an example, which should not unduly limit the scope of the claims. One of ordinary skill in the art would recognize many variations, alternatives, and modifications. The system 100 includes an application server 102, a database server 104, a data storage 106, a client device 108, and a display 110. In some examples, the application server 102 includes a tile generator 112. In certain examples, the application server 102 is configured to receive large amount of streamed data 114 from the one or more data sources 116. For example, the application server 102 is configured to send the data 114 with low latency or no latency to the client device 108 (e.g., send the data 114 as the data 114 is received from the data sources 116). According to some examples, the tile generator 112 processes the data 114 and sends the processed data to the database server 104 to be stored in the data storage 106. According to certain examples, the client device 108 includes a mapping application 118.

In some embodiments, the mapping application 118 is configured to process the data 114 received from the application server 102. For example, the mapping application 118 is configured to determine which data 114 from the data sources 116 is to be displayed on a map 120. In some examples, the mapping application 118 is configured to send the processed data to the display 110 to visualize the data 114 to a user of the device 108 on the map 120. For example, the map 120 includes a map of a particular spatial area or geographic area. In one example, the map 120 includes an interactive map that allows the user to interact with data that is displayed on the map 120.

In certain embodiments, the interactive map 120 is part of a map user interface displayed on the display 110 connected to the client device 108. In some examples, the map user interface allows the user to spatially zoom and/or temporally zoom in on the map 120 or out of the map 120. For example, in response to a zoom request by the user, the mapping application 118 renders a new map 120 at the requested spatial zoom level and/or temporal zoom level. In certain examples, the interactive map 120 allows the user to change the view point of the displayed map 120 corresponding to a different time than the current time. For example, the user selects to display data dated from a year prior to the current time on the interactive map 120. As an example, the mapping application 118 renders a new map 120 at the requested view point in time. According to some examples, the mapping application 118 is configured to receive a request by the user for a map of a particular spatial zoom level and/or temporal zoom level. For example, in response to the user request, the mapping application 118 request the map 120 corresponding to the particular spatial zoom level and/or temporal zoom level from the application server 102.

In some embodiments, the requested map 120 includes one or more tiles 122. As an example, the application server 102 is configured to send the one or more tiles 122 of the requested map 120 to the client device 118 to be displayed as a map on the display 110. In some examples, the tile generator 112 is configured to generate one or more tiles 122 based at least in part on the data 114. For example, the application server 102 is configured to store the generated one or more tiles 112 in the data storage 106. As an example, the application server 102 is configured to send the generated one or more tiles 112 to the database server 104 to store the tiles 112 in the data storage 106. In certain examples, the application server 102 is configured to retrieve one or more tiles 122 from the data storage 106 and send the one or more tiles 122 to the client device 108.

According to some embodiments, the data 114 received from the data sources 116 include information associated with data objects. For example, the data 114 include metadata relating to data objects. In some examples, data objects include individuals, collections of individuals, devices, vehicles, sensors, satellites and other types of data objects. For example, data objects include a unique identifier to identify the data object. In certain examples, data objects are associated with other data objects through links or relationships. For example, a car provides data about its current location and status, and, as an example, is also associated with its driver, providing information about the driver. In some examples, data objects are associated with activities, conditions and events relating to data objects, and include, for example, relationships to other data objects. In one example, activities, conditions and events include weather, road and traffic conditions, calling a person, and sending text messages. For example, data objects include data sources. In certain examples, the data 114 include images, sound content, video, graphics and other audiovisual data as well as documents, files, messages and/or other data content.

According to certain embodiments, the data 114 received from the data sources 116 include geospatial information and temporal information for the data objects. For example, geospatial information includes geographic coordinates (e.g., longitude coordinates and latitude coordinates), geographic topography, and other geographic information of data objects. In some example, the geospatial information identifies the location of a data object. In some examples, the temporal information includes a time associated with a data object. For example, the geospatial information and the temporal information provides information related to geographic movements of the data object over time. In one example, the geospatial information includes a certain geographic location associated with a data object, and the temporal information includes a certain date and a certain time of the day associated with the data object. In one example, the certain geographic location includes a certain longitude coordinate and a certain latitude coordinate associated with the data object. For example, the certain date includes a certain day, a certain month, and a certain year associated with the data object. In certain examples, the geospatial information and the temporal information is used to identify the geographic location of the data object at a particular time.

In some embodiments, the tile generator 112 is configured to process the data 114 and generate one or more tiles 122 based on the processed data. In some examples, the processed data 114 includes a large number of data objects (e.g., millions of data objects). For example, to increase the processing efficiency, the tile generator 112 is configured to generate the one or more tiles 122 at a time that the data 114 is received from the data sources 116. In one example, the tile generator 112 is configured to generate the one or more tiles 122 based at least in part on the data 114 received from the data streams 116. As an example, the data 114 includes temporal information and geospatial information for each object of one or more data objects. In certain examples, the data 114 included in the tile 122 is associated with the corresponding one or more data objects. In some examples, the one or more tiles 122 are stored in the data storage 106.

In certain embodiments, the one or more tiles 122 generated by the tile generator 112 correspond to a temporal dimension associated with a temporal width. For example, the temporal width is predetermined. In some examples, the one or more tiles 122 are one or more multidimensional tile. For example, the one or more tiles 122 are three-dimensional (3D) tiles. In certain examples, the temporal width relates to a temporal zoom level. For example, the temporal width includes a temporal width of one hour. In other examples, the temporal width includes 1 second, 1 minute, 10 minutes, 2 hours, 4 hours, 6 hours, 10 hours, 1 day, 1 week, 1 month, 6 months, 1 year and/or any other time interval.

According to some embodiments, the one or more tile 122 are associated with a first spatial dimension and a second spatial dimension. In some examples, the first spatial dimension is different from the second spatial dimension. For example, the first spatial dimension relates to an x coordinate of the tile 122. In one example, the second spatial dimension relates to a y coordinate of the tile 122. For example, the x coordinate and y coordinate of the tile 122 relate to a longitude coordinate and a latitude coordinate, respectively. For example, the longitude coordinate includes 0.005 degrees longitude, 0.01 degrees longitude, 0.02 degrees longitude, 0.04 degrees longitude and/or other degrees longitudes. In one example, the latitude coordinate includes 0.005 degrees latitude, 0.01 degrees latitude, 0.02 degrees latitude, 0.04 degrees latitude and/or other degrees latitudes.

In some examples, the first spatial dimension is related to a first spatial zoom level. In certain examples, the second spatial dimension is related to a second spatial zoom level. In one example, the first zoom level and the second zoom level are the same. In certain examples, the first spatial zoom level and the second spatial zoom level are predetermined.

In some examples, the spatial zoom level includes 1:8000, 1:16000, 1:32000, 1:64000 and/or any other spatial zoom levels of a map.

In some embodiments, the one or more tiles 122 generated by the tile generator 112 associated with the same temporal width are consecutive in time. For example, one tile of the one or more tiles 122 ends at a particular time along the temporal dimension and the next tile of the one or more tiles 122 starts at the particular time along the temporal dimension. In some examples, the one or more tiles 122 include 24 tiles with a width of 1 hour. For example, the 24 1-hour tiles correspond to the 24 hours of a particular day in time. In one example, a first tile of the 24 1-hour tiles corresponds to a 1st hour (e.g., 00:01 to 01:00) of a particular day in time. As an example, a second tile of the 24 1-hour tiles correspond to a 2nd hour (e.g., 01:01 to 02:00) of the particular day in time. In one example, a 24th tile of the 24 1-hour tiles corresponds to a 24th hour (e.g., 23:01 to 24:00) of the particular day in time.

In certain embodiments, the one or more tiles 122 include 1-hour tiles, 1-day tiles, 1-week tiles, 1-month tiles, 1-year tiles and other tiles with a temporal width included in a predetermined time interval. For example, the predetermined time interval starts two years prior to the current date and time and ends at the current date and time. In one example, the time interval is continuous in time. In some examples, the tile generator 112 is configured to determine the largest temporal width included in the predetermined time interval.

According to some embodiments, the one or more tiles 122 generated by the tile generator 112 associated with the same first spatial zoom level and/or same second spatial zoom level are consecutive in space. For example, one tile of the one or more tiles 122 ends at a particular spatial boundary along one spatial dimension and the next tile starts at the particular spatial boundary along the same spatial dimension. In certain examples, the first zoom level and the second spatial zoom level of the one or more tiles 122 are the same. In some examples, the one or more tiles 122 correspond to a particular geographic area and spatial zoom level (e.g., the first spatial zoom level). For example, a first tile of the one or more tiles 122 corresponds to a street-level map of San Francisco at a spatial zoom level of 1:8000. In another example, a second tile of the one or more tiles 122 corresponds to a street-level map of San Jose at a spatial zoom level of 1:8000. In certain examples, the one or more tiles 122 include 1:8000 tiles that include a street-level map of the entire earth.

According to certain embodiments, one or more dimensions of the one or more multi-dimensional tiles 122 correspond to particular properties of the data objects associated with the tiles 122. For example, the properties include weather, traffic, topography, geographic elevation, real estate prices, geographic artifacts, and/or other properties of the data objects. In some examples, the one or more dimensions of the multi-dimensional tiles 122 correspond to at least one temporal dimension and two spatial dimensions. In certain examples, the one or more multi-dimensional tiles 122 are 3D tiles. For example, the 3D tile corresponds to a temporal dimension (e.g., time t) associated with a temporal width (e.g., 1 hour) and two spatial dimensions (e.g., x coordinate and y coordinate). In one example, each spatial dimension is associated with a spatial zoom level (e.g., 1:8000). As an example, the x coordinate corresponds to a latitude coordinate, and the y coordinate correspond to a longitude coordinate.

In some embodiments, the one or more tiles 122 include data represented by a number of data points. In some examples, data points are combined by combining the spatial and temporal resolutions of the one or more tiles 122. In some examples, for a constant spatial resolution (e.g., a 10-meter-by-10-meter grid area), data points are distributed evenly according to a rate of 10 data points/minute. For example, tiles with a 1-minute resolution include 10 data points per tile. As an example, 1-hour resolution tiles include 600 data points per tile. In certain examples, for tiles with a constant temporal resolution (e.g., a 1-hour time window), the number of data points per tile is determined in a similar manner. For example, a 100-square-meter tile with a uniform spatial distribution of 10 points/meter includes 1000 unique data points.

In some embodiments, as illustrated in FIG. 1, the tile generator 112 receives streamed data of data objects (e.g., D1, D2, D3, D4, etc.) within a particular time frame (e.g., 1 hour). In some examples, the temporal information of the data objects D1, D2, D3, and D4 includes timestamp of times $t_1$, $t_2$, $t_3$, and $t_4$, respectively, that are within the particular time frame. For example, in response to receiving the data within the particular time frame, the tile generator 112 is configured to generate the tile 122 with a temporal width (e.g., 1 hour) that corresponds to the particular time frame (e.g., 1 hour). In one example, the tile generator 112 generates the tile 122 with a predetermined temporal width (e.g., 1 day) that is larger than the particular time frame. In certain examples, the generated tile 122 includes data associated with timestamps within the particular time frame. For example, the tile generator 112 is configured to generate tile 122 that includes the data of data objects D1, D2, D3 and D4, if timestamps $t_1$, $t_2$, $t_3$, and $t_4$ of the data are within the 1-hour time frame. As an example, if the timestamps of certain data points are within the time frame associated with the tile 122, the data points are included in the tile 122. In certain examples, the tiles 122 generated by the tile generator 112 and data points included in generated tiles 122 are stored in the data storage 106 by the database server 104.

Figure 2:
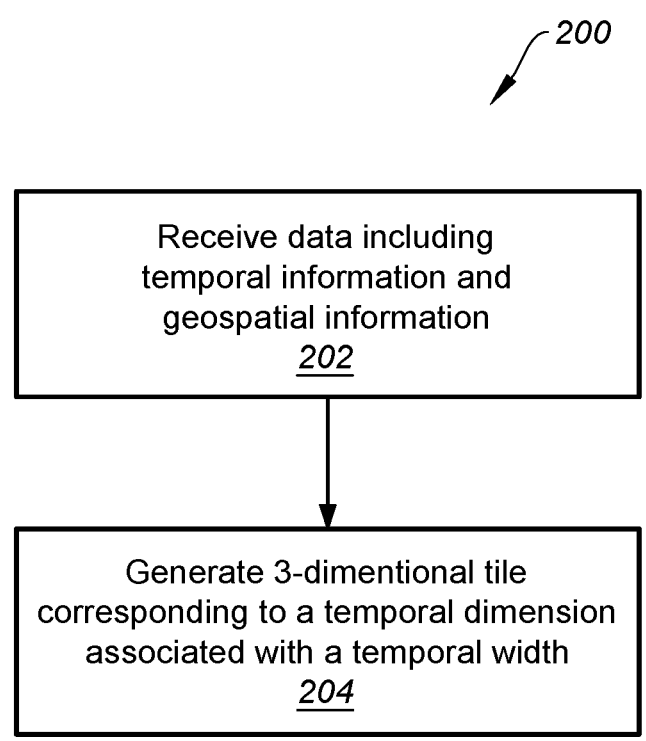
FIG. 2 is a simplified diagram showing a method for processing and displaying time-related geospatial data according to one embodiment of the present invention.

FIG. 2 is a simplified diagram showing a method for processing and displaying time-related geospatial data according to one embodiment of the present invention. This diagram is merely an example, which should not unduly limit the scope of the claims. One of ordinary skill in the art would recognize many variations, alternatives, and modifications. The method 200 includes process 202 for receiving raw data including geographic coordinates and time stamp, and process 204 for generating a 3D tile including two dimensions corresponding to the geographic coordinates and one dimension corresponding to time. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 200 are performed by the system 100. In certain examples, some or all processes (e.g., steps) of the method 200 are performed by a computer and/or a processor directed by a code. For example, a computer includes a server computer and/or a client computer (e.g., a smartphone). In some examples, some or all processes (e.g., steps) of the method 200 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone, and/or a server rack). As an example, instructions included by a non-transitory computer-readable medium are executed by a processor including a processor of a server computer and/or a processor of a client computer (e.g., a smartphone, and/or server rack).

According to some embodiments, at the process 202, data is received from one or more data sources. In some examples, the received data includes temporal information and geospatial information for each data object of one or more data objects. For example, the temporal information includes timestamps of the received data. In one example, the geospatial information includes geographic coordinates of the received data.

According to certain embodiments, at the process 204, a 3D tile is generated. In some examples, the 3D tile corresponds to a temporal dimension associated with a temporal width. In certain examples, the 3D tile corresponds to two spatial dimensions. For example, first spatial dimension relates to a first spatial zoom level. In one example, the second spatial dimension relates to a second spatial zoom level. As an example, the spatial dimensions correspond to geographic coordinates of the received data. According to some examples, the 3D tiles is generated based at least in part on the temporal information and the geospatial information for each data object of one or more data objects included in the received data.

As discussed above and further emphasized here, FIG. 2 is merely an example, which should not unduly limit the scope of the claims. One of ordinary skill in the art would recognize many variations, alternatives, and modifications. In some examples, a multi-dimensional tile is generated based at least in part on the temporal information and the geospatial information. For example, one dimension of the multi-dimensional tile corresponds to a temporal dimension associated with a particular temporal width. As an example, the temporal width of the multi-dimensional tile is determined based on the temporal information included in the received data. In one example, two dimensions of the multi-dimensional tile correspond to spatial dimensions associated with spatial zoom levels. As an example, the spatial zoom levels are determined based on the geospatial information included in the received data.

Figure 3A:
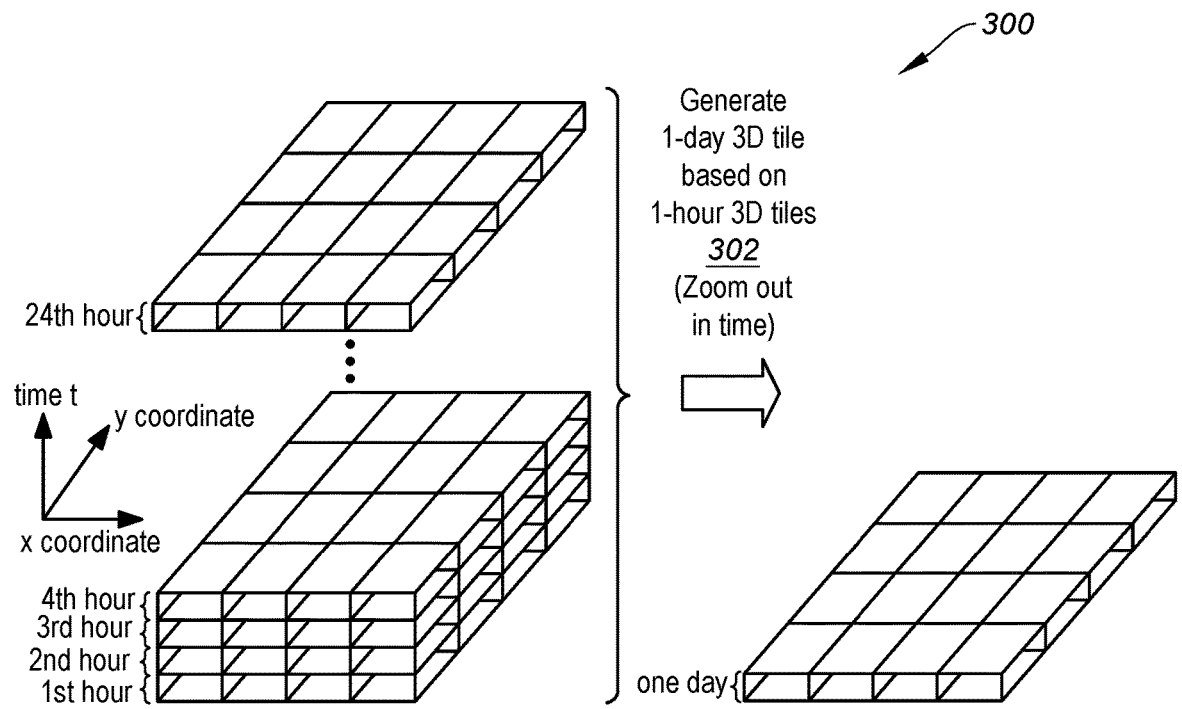
FIG. 3A is a simplified diagram showing a method for generating temporal tiles according to one embodiment of the present invention.

FIG. 3A is a simplified diagram showing a method 300 for generating temporal tiles according to one embodiment of the present invention. This diagram is merely an example, which should not unduly limit the scope of the claims. One of ordinary skill in the art would recognize many variations, alternatives, and modifications. The method 300 includes process 302 for generating one tile of one or more second temporal tiles associated with a second temporal width based at least in part on multiple tiles of one or more first temporal tiles associated with a first temporal width. In some examples, the first temporal width is smaller than the second temporal width. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 300 are performed by the system 100. In certain examples, some or all processes (e.g., steps) of the method 300 are performed by a computer and/or a processor directed by a code. For example, a computer includes a server computer and/or a client computer (e.g., a smartphone). In some examples, some or all processes (e.g., steps) of the method 300 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone, and/or a server rack). As an example, instructions included by a non-transitory computer-readable medium are executed by a processor including a processor of a server computer and/or a processor of a client computer (e.g., a smartphone, and/or server rack).

In certain embodiments, at the process 302, one tile of the one or more second temporal tiles (e.g., one 1-day 3D tile) associated with a second temporal width (e.g., one-day width) are generated based at least in part on multiple tiles of the one or more first temporal tiles (e.g., 24 1-hour 3D tiles) associated with a first temporal width (e.g., 1-hour width). In some examples, a zoom-in is performed so that the temporal width decreases (e.g., decreasing from a 1-day width to a 1-hour width). In certain examples, a zoom-out is performed so that the temporal width increases (e.g., increasing from a 1-hour width to a 1-day width). For example, the first temporal width (e.g., 1-hour width) is smaller than the second temporal width (e.g., 1-day width). In some examples, the spatial zoom level (e.g., 1:8000) of the one tile (e.g., one 1-day 3D tile) is equal to the spatial zoom level (e.g., 1:8000) of the multiple tiles (e.g., 24 1-hour 3D tiles). For example, the one tile (e.g., one 1-day 3D tile) allows for zooming out in time from the multiple tiles (e.g., 24 1-hour 3D tiles). In one example, the first 1-hour 3D tile corresponds to the 1st hour (e.g., 00:01 to 01:00) of a particular day in time, the second 1-hour 3D tile corresponds to the 2nd hour (e.g., 01:01 to 02:00) of the particular day in time, the third 1-hour 3D tile corresponds to the 3rd hour (e.g., 02:01 to 03:00) of the particular day in time, the fourth 3D 1-hour tile correspond to the 4th hour (e.g., 03:01 to 04:00) of the particular day in time, and so on, and the 24th 1-hour 3D tile corresponds to the 24th hour (e.g., 23:01 to 24:00) of the particular day in time.

According to some embodiments, the multiple first tiles of the one or more first temporal tiles (e.g., 24 1-hour tiles) include first data represented by a first number of data points. In some examples, one tile of the one or more second temporal tiles (e.g., one 1-day 3D tile) includes second data represented by a second number of data points. For example, the data size of one of the one or more first temporal tiles (e.g., one 1-hour 3D tile) is equal to the data size of one of the one or more second temporal tiles (e.g., one 1-day 3D tile). In certain examples, the first data is converted to the second data by using a simplification algorithm. In some examples, the simplification algorithm includes line simplification algorithms and/or other compression algorithms to reduce the amount of converted second data. For example, the second number of converted data points is equal to the first number of data points. Examples of line simplification algorithms include the Ramer-Douglas-Peucker algorithm, the Visvalingam-Whyatt algorithm, the Reuman-Witkam algorithm, the Opheim algorithm, the Lang algorithm, and the Zhao-Saalfeld algorithm. For example, the simplification algorithm reduces the number of data points in a first curve by approximating the first curve with a second curve including a smaller number of data points than the first curve. As an example, the second curve includes a shape similar to the shape of the first curve.

Figure 3B:
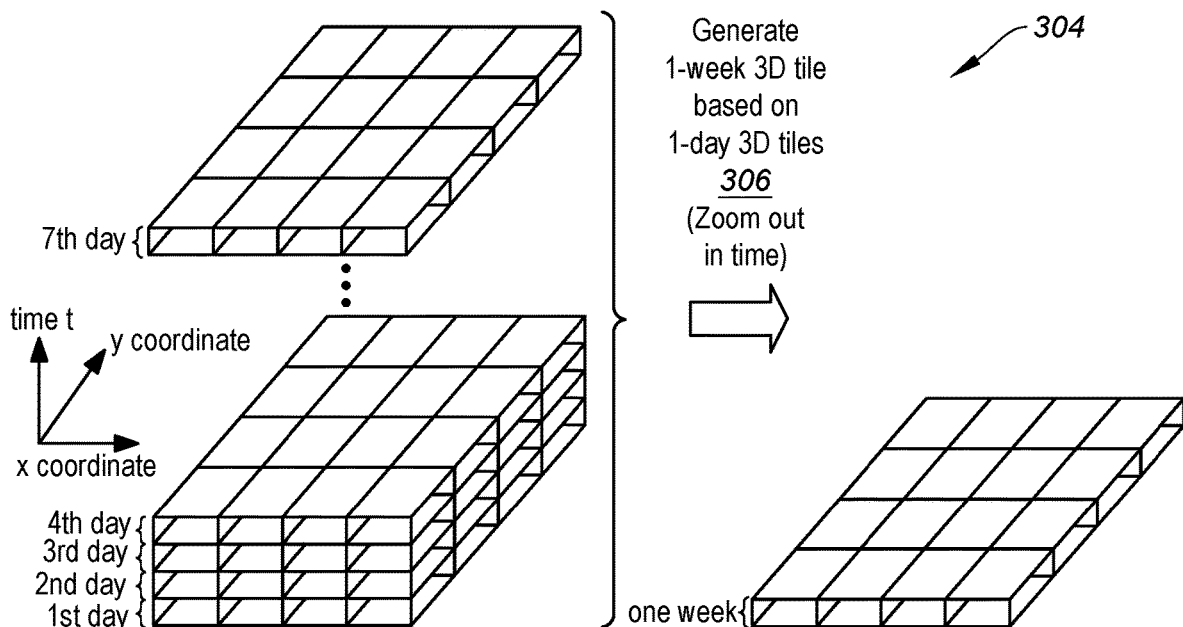
FIG. 3B is a simplified diagram showing a method for generating temporal tiles according to one embodiment of the present invention.

FIG. 3B is a simplified diagram showing a method 304 for generating temporal tiles according to one embodiment of the present invention. This diagram is merely an example, which should not unduly limit the scope of the claims. One of ordinary skill in the art would recognize many variations, alternatives, and modifications. The method 304 includes process 306 for generating one tile of one or more second temporal tiles associated with a second temporal width based at least in part on multiple tiles of one or more first temporal tiles associated with a first temporal width. In some examples, the first temporal width is smaller than the second temporal width. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 304 are performed by the system 100. In certain examples, some or all processes (e.g., steps) of the method 304 are performed by a computer and/or a processor directed by a code. For example, a computer includes a server computer and/or a client computer (e.g., a smartphone). In some examples, some or all processes (e.g., steps) of the method 304 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone, and/or a server rack). As an example, instructions included by a non-transitory computer-readable medium are executed by a processor including a processor of a server computer and/or a processor of a client computer (e.g., a smartphone, and/or server rack).

In certain embodiments, at the process 306, one tile of the one or more second temporal tiles (e.g., one 1-week 3D tile) associated with a second temporal width (e.g., one-week width) are generated based at least in part on multiple tiles of the one or more first temporal tiles (e.g., 7 1-day 3D tiles) associated with a first temporal width (e.g., 1-day width). In some examples, a zoom-in is performed so that the temporal width decreases (e.g., decreasing from a 1-week width to a 1-day width). In certain examples, a zoom-out is performed so that the temporal width increases (e.g., increasing from a 1-day width to a 1-week width). For example, the first temporal width (e.g., 1-day width) is smaller than the second temporal width (e.g., 1-week width). In some examples, the spatial zoom level (e.g., 1:8000) of the one tile (e.g., one 1-week 3D tile) is equal to the spatial zoom level (e.g., 1:8000) of the multiple tiles (e.g., 7 1-day 3D tiles). For example, the one tile (e.g., one 1-week 3D tile) allows for zooming out in time from the multiple tiles (e.g., 7 1-day 3D tiles). In one example, the first 1-day 3D tile corresponds to the 1st day (e.g., Monday) of a particular week in time, the second 1-day 3D tile corresponds to the 2nd day (e.g., Tuesday) of the particular week in time, the third 1-day 3D tile corresponds to the 3rd day (e.g., Wednesday) of the particular day in time, the fourth 3D 1-day tile correspond to the 4th day (e.g., Thursday) of the particular week in time, and so on, with the seventh 1-day 3D tile corresponding to the 7th day (e.g., Sunday) of the particular week in time.

According to some embodiments, the multiple first tiles of the one or more first temporal tiles (e.g., 7 1-day tiles) include first data represented by a first number of data points. In some examples, one tile of the one or more second temporal tiles (e.g., one 1-week 3D tile) includes second data represented by a second number of data points. For example, the data size of one of the one or more first temporal tiles (e.g., one 1-day 3D tile) is equal to the data size of one of the one or more second temporal tiles (e.g., one 1-week 3D tile). In certain examples, the first data is converted to the second data by using a simplification algorithm. In some examples, the simplification algorithm includes line simplification algorithms and/or other compression algorithms to reduce the amount of converted second data. For example, the second number of converted data points is equal to the first number of data points. Examples of line simplification algorithms include the Ramer-Douglas-Peucker algorithm, the Visvalingam-Whyatt algorithm, the Reuman-Witkam algorithm, the Opheim algorithm, the Lang algorithm, and the Zhao-Saalfeld algorithm. For example, the simplification algorithm reduces the number of data points in a first curve by approximating the first curve with a second curve including a smaller number of data points than the first curve. As an example, the second curve includes a shape similar to the shape of the first curve.

Figure 4A:
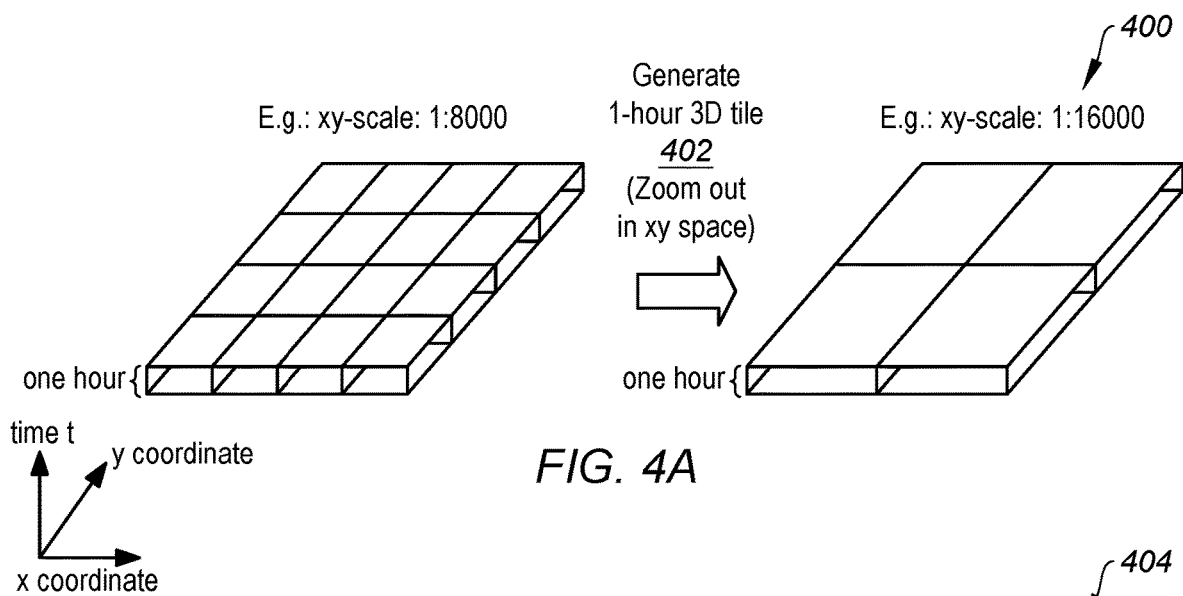
FIG. 4A is a simplified diagram showing a method for generating temporal tiles according to one embodiment of the present invention.

FIG. 4A is a simplified diagram showing a method 400 for generating temporal tiles according to one embodiment of the present invention. This diagram is merely an example, which should not unduly limit the scope of the claims. One of ordinary skill in the art would recognize many variations, alternatives, and modifications. The method 400 includes process 402 for generating a second temporal tiles associated with a second spatial zoom level based at least in part on a first temporal tile associated with a first spatial zoom level. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 400 are performed by the system 100. In certain examples, some or all processes (e.g., steps) of the method 400 are performed by a computer and/or a processor directed by a code. For example, a computer includes a server computer and/or a client computer (e.g., a smartphone). In some examples, some or all processes (e.g., steps) of the method 400 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone, and/or a server rack). As an example, instructions included by a non-transitory computer-readable medium are executed by a processor including a processor of a server computer and/or a processor of a client computer (e.g., a smartphone, and/or server rack).

In certain embodiments, at the process 402, the second temporal tile with the second spatial area (e.g., 1-hour 3D tile with 1:16000) is generated based on the first temporal tile with the second spatial area (e.g., 1-hour 3D tile with 1:8000). In some examples, a zoom-in is performed so that the spatial zoom level increases (e.g., increasing from 1:16000 to 1:8000). In certain examples, a zoom-out is performed so that the spatial zoom level decreases (e.g., decreasing from 1:8000 to 16:000). For example, the second spatial zoom level (e.g., 1:16000) is smaller than the first spatial zoom level (e.g., 1:8000). In some examples, the temporal width (e.g., 1 hour) of the first temporal tile (e.g., 1-hour 3D tile with 1:8000) is identical to the temporal width (e.g., 1 hour) of the second temporal tile (e.g., 1-hour 3D tile with 1:16000). For example, the second temporal tile (e.g., 1-hour 3D tile with 1:16000) allows for zooming out in space from the first temporal tile (e.g., 1-hour 3D tile with 1:8000).

According to some embodiments, the first temporal tile (e.g., 1-hour 3D tile with 1:8000) includes first data represented by a first number of data points. In some examples, the second temporal tile (e.g., 1-hour 3D tile with 1:16000) includes second data represented by a second number of data points. For example, the data size of the first temporal tile (e.g., 1-hour 3D tile with 1:8000) is equal to the data size of the second temporal tile (e.g., 1-hour 3D tile with 1:16000). In certain examples, the first data is converted to the second data by using a simplification algorithm. In some examples, the simplification algorithm includes line simplification algorithms and/or other compression algorithms to reduce the amount of converted second data. For example, the second number of converted data points is equal to the first number of data points. Examples of line simplification algorithms include the Ramer-Douglas-Peucker algorithm, the Visvalingam-Whyatt algorithm, the Reuman-Witkam algorithm, the Opheim algorithm, the Lang algorithm, and the Zhao-Saalfeld algorithm. For example, the simplification algorithm reduces the number of data points in a first curve by approximating the first curve with a second curve including a smaller number of data points than the first curve. As an example, the second curve includes a shape similar to the shape of the first curve.

Figure 4B:
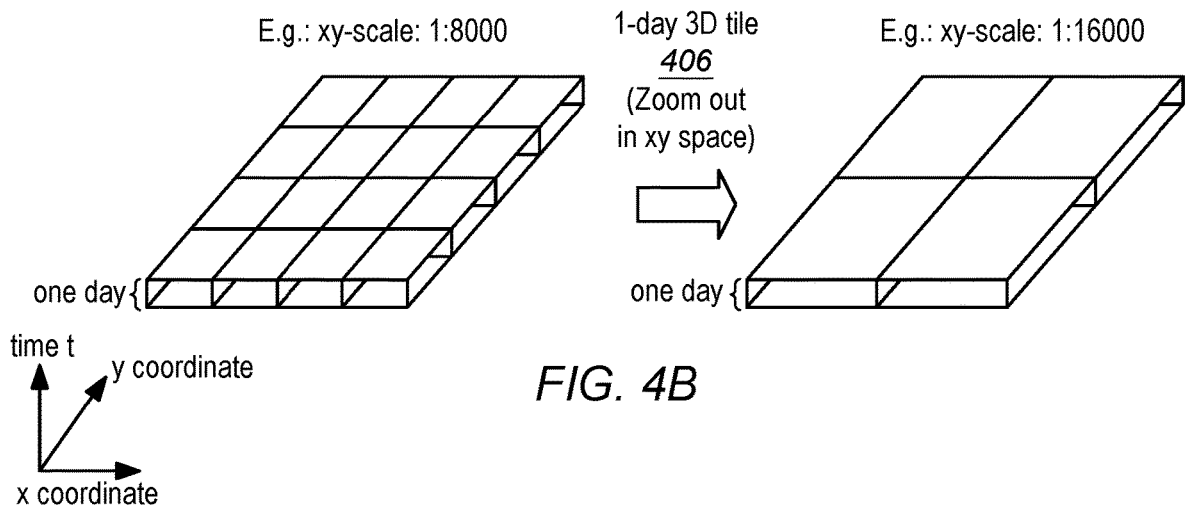
FIG. 4B is a simplified diagram showing a method for generating temporal tiles according to one embodiment of the present invention.

FIG. 4B is a simplified diagram showing a method 404 for generating temporal tiles according to one embodiment of the present invention. This diagram is merely an example, which should not unduly limit the scope of the claims. One of ordinary skill in the art would recognize many variations, alternatives, and modifications. The method 404 includes process 406 for generating a second temporal tiles associated with a second spatial zoom level based at least in part on a first temporal tile associated with a first spatial zoom level. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 404 are performed by the system 100. In certain examples, some or all processes (e.g., steps) of the method 404 are performed by a computer and/or a processor directed by a code. For example, a computer includes a server computer and/or a client computer (e.g., a smartphone). In some examples, some or all processes (e.g., steps) of the method 404 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone, and/or a server rack). As an example, instructions included by a non-transitory computer-readable medium are executed by a processor including a processor of a server computer and/or a processor of a client computer (e.g., a smartphone, and/or server rack).

In certain embodiments, at the process 406, the second temporal tile with the second spatial area (e.g., 1-day 3D tile with 1:16000) is generated based on the first temporal tile with the second spatial area (e.g., 1-day 3D tile with 1:8000). In some examples, a zoom-in is performed so that the spatial zoom level increases (e.g., increasing from 1:16000 to 1:8000). In certain examples, a zoom-out is performed so that the spatial zoom level decreases (e.g., decreasing from 1:8000 to 16:000). For example, the second spatial zoom level (e.g., 1:16000) is smaller than the first spatial zoom level (e.g., 1:8000). In certain examples, the temporal width (e.g., 1 day) of the first temporal tile (e.g., 1-day 3D tile with 1:8000) is identical to the temporal width (e.g., 1 day) of the second temporal tile (e.g., 1-day 3D tile with 1:16000). As an example, the second temporal tile (e.g., 1-day 3D tile with 1:16000) allows for zooming out in space from the first temporal tile (e.g., 1-day 3D tile with 1:8000).

According to some embodiments, the first temporal tile (e.g., 1-day 3D tile with 1:8000) includes first data represented by a first number of data points. In some examples, the second temporal tile (e.g., 1-day 3D tile with 1:16000) includes second data represented by a second number of data points. For example, the data size of the first temporal tile (e.g., 1-day 3D tile with 1:8000) is equal to the data size of the second temporal tile (e.g., 1-day 3D tile with 1:16000). In certain examples, the first data is converted to the second data by using a simplification algorithm. In some examples, the simplification algorithm includes line simplification algorithms and/or other compression algorithms to reduce the amount of converted second data. For example, the second number of converted data points is equal to the first number of data points. Examples of line simplification algorithms include the Ramer-Douglas-Peucker algorithm, the Visvalingam-Whyatt algorithm, the Reuman-Witkam algorithm, the Opheim algorithm, the Lang algorithm, and the Zhao-Saalfeld algorithm. For example, the simplification algorithm reduces the number of data points in a first curve by approximating the first curve with a second curve including a smaller number of data points than the first curve. As an example, the second curve includes a shape similar to the shape of the first curve.

FIG. 4B is a simplified diagram showing a method 408 for generating temporal tiles according to one embodiment of the present invention. This diagram is merely an example, which should not unduly limit the scope of the claims. One of ordinary skill in the art would recognize many variations, alternatives, and modifications. The method 408 includes process 410 for generating a second temporal tiles associated with a second spatial zoom level based at least in part on a first temporal tile associated with a first spatial zoom level. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 408 are performed by the system 100. In certain examples, some or all processes (e.g., steps) of the method 408 are performed by a computer and/or a processor directed by a code. For example, a computer includes a server computer and/or a client computer (e.g., a smartphone). In some examples, some or all processes (e.g., steps) of the method 408 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone, and/or a server rack). As an example, instructions included by a non-transitory computer-readable medium are executed by a processor including a processor of a server computer and/or a processor of a client computer (e.g., a smartphone, and/or server rack).

In certain embodiments, at the process 410, the second temporal tile with the second spatial area (e.g., 1-week 3D tile with 1:16000) is generated based on the first temporal tile with the second spatial area (e.g., 1-week 3D tile with 1:8000). In some examples, a zoom-in is performed so that the spatial zoom level increases (e.g., increasing from 1:16000 to 1:8000). In certain examples, a zoom-out is performed so that the spatial zoom level decreases (e.g., decreasing from 1:8000 to 16:000). For example, the second spatial zoom level (e.g., 1:16000) is smaller than the first spatial zoom level (e.g., 1:8000). In certain examples, the temporal width (e.g., 1 week) of the first temporal tile (e.g., 1-week 3D tile with 1:8000) is identical to the temporal width (e.g., 1 week) of the second temporal tile (e.g., 1-week 3D tile with 1:16000). As an example, the second temporal tile (e.g., 1-week 3D tile with 1:16000) allows for zooming out in space from the first temporal tile (e.g., 1-week 3D tile with 1:8000).

According to some embodiments, the first temporal tile (e.g., 1-week 3D tile with 1:8000) includes first data represented by a first number of data points. In some examples, the second temporal tile (e.g., 1-week 3D tile with 1:16000) includes second data represented by a second number of data points. For example, the data size of the first temporal tile (e.g., 1-week 3D tile with 1:8000) is equal to the data size of the second temporal tile (e.g., 1-week 3D tile with 1:16000). In certain examples, the first data is converted to the second data by using a simplification algorithm. In some examples, the simplification algorithm includes line simplification algorithms and/or other compression algorithms to reduce the amount of converted second data. For example, the second number of converted data points is equal to the first number of data points. Examples of line simplification algorithms include the Ramer-Douglas-Peucker algorithm, the Visvalingam-Whyatt algorithm, the Reuman-Witkam algorithm, the Opheim algorithm, the Lang algorithm, and the Zhao-Saalfeld algorithm. For example, the simplification algorithm reduces the number of data points in a first curve by approximating the first curve with a second curve including a smaller number of data points than the first curve. As an example, the second curve includes a shape similar to the shape of the first curve.

As discussed above and further emphasized here, FIGS. 3A, 3B, 4A, 4B and 4C are merely examples, which should not unduly limit the scope of the claims. One of ordinary skill in the art would recognize many variations, alternatives, and modifications. In some examples, the first temporal tiles and the second temporal tiles are multi-dimensional tiles. For example, one dimension of the multi-dimensional tile corresponds to a temporal dimension associated with a temporal width. As an example, two dimensions of the multi-dimensional tile correspond to spatial dimensions related to spatial zoom levels.

Figure 5:
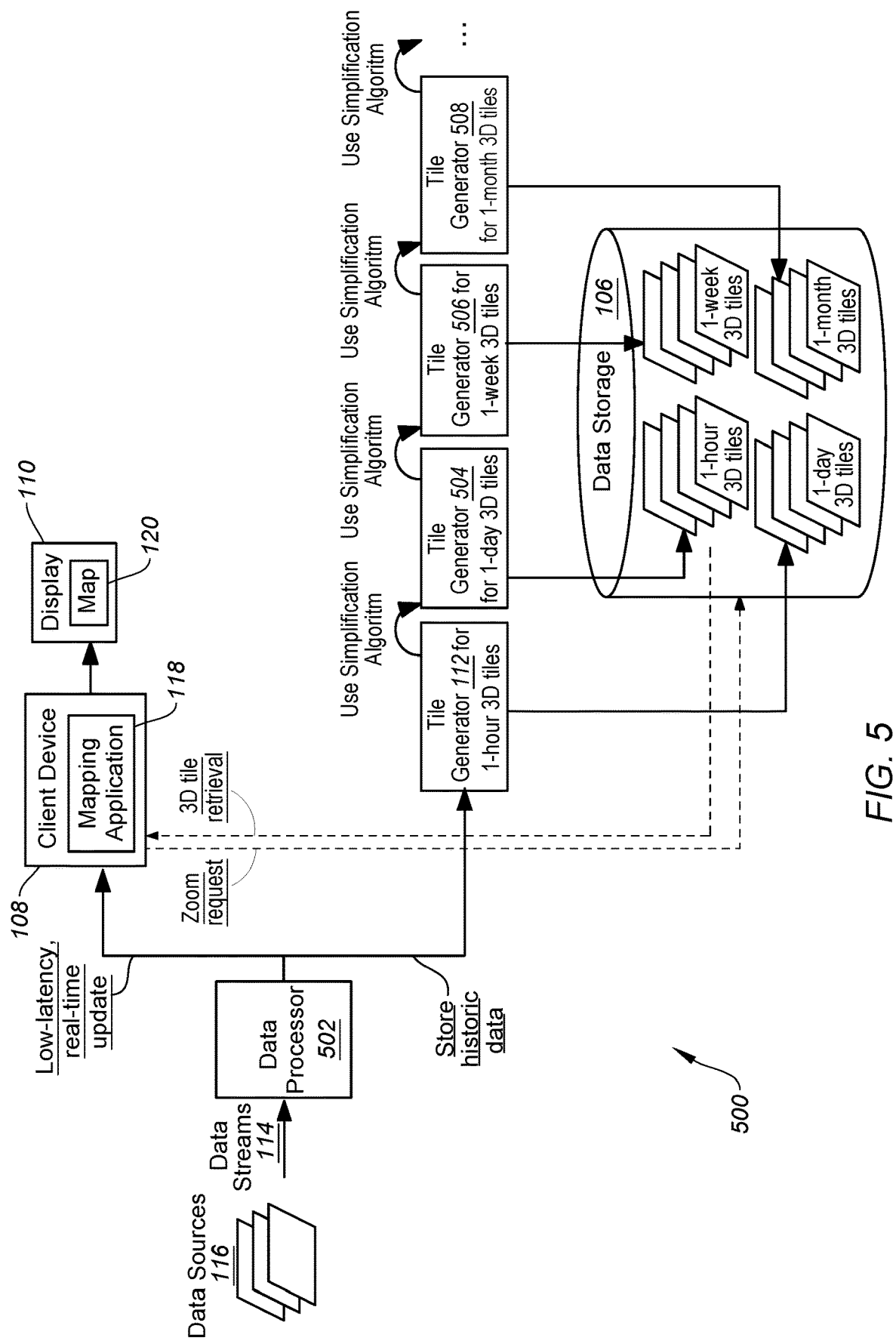
FIG. 5 is a simplified diagram showing a system for processing and displaying time-related geospatial data according to one embodiment of the present invention.

FIG. 5 is a simplified diagram showing a system 500 for processing and displaying time-related geospatial data according to one embodiment of the present invention. In some embodiments, some or all processes (e.g., steps) of the method 200, the method 300, the method 304, the method 400, the method 404, and/or the method 408 are performed by the system 500. This diagram is merely an example, which should not unduly limit the scope of the claims. One of ordinary skill in the art would recognize many variations, alternatives, and modifications. The system 500 includes data processor 502, a data storage 106, a client device 108, a display 110, and a mapping engine 112. In some examples, the mapping engine 112 includes tile generators 112, 504, 506, 508. In some examples, the client device 108 includes a mapping application 118. In certain examples, the data processor 502 is configured to receive large amount of streamed data 114 from the one or more data sources 116. For example, the data processor 502 is configured to process and send the data 114 with low latency or no latency to the client device 108 (e.g., send the data 114 as the data 114 is received from the data sources 116). According to some examples, the data processor 502 is configured to send the processed data to the tile generator 112 for generating temporal tiles and for storing the history of the data 114 in the data storage 106 for retrieval by the client device 108.

In some embodiments, the tile generator 112 is configured to receive the processed data from the data processor 502. For example, the received data include temporal information (e.g., timestamps) and geospatial information (e.g., geographic coordinates) for one or more data objects included in the data. In some examples, the tile generator 112 is configured to generate one or more first tiles (e.g., 1-hour 3D tiles) based on the received data. For example, the tile generator 112 is configured to generate the one or more first temporal tiles (e.g., 1-hour 3D tiles) based at least in part on the temporal information (e.g., timestamps) and the geospatial information (e.g., geographic coordinates) included in the received data (e.g., as shown in FIG. 1 and FIG. 2). In one example, the one or more first temporal tiles (e.g., 1-hour 3D tiles) correspond to a temporal dimension associated with a temporal width (e.g., 1 hour). As an example, the one or more first temporal tiles (e.g., 1-hour 3D tiles) correspond to a first spatial dimension (e.g., x coordinate) and a second spatial dimension (e.g., y coordinate). For example, the first spatial dimension (e.g., x coordinate) is related to a first spatial zoom level (e.g., 1:8000). In one example, the second spatial dimension (e.g., x coordinate) is related to a second spatial zoom level (e.g., 1:8000). According to some examples, the tile generator 112 is configured to send the one or more first temporal tiles (e.g., 1-hour 3D tiles) to the data storage 106 to be stored for retrieval by the client device 108. In some examples, in response to a zoom request from the mapping application 112, one or more tiles of the one or more first temporal tiles stored in the data storage 106 are send to the client device 108. In certain examples, the tile generator 112 is configured to send the one or more first temporal tiles (e.g., 1-hour 3D tiles) to the tile generator 504 to generate one or more second temporal tiles (e.g., 1-day 3D tiles).

In certain embodiments, the tile generator 504 is configured to receive the one or more first temporal tiles (e.g., 1-day 3D tiles) from the tile generator 112. In some examples, the tile generator 504 is configured to generate the one or more second temporal tiles (e.g., 1-day 3D tiles) based at least in part on the one or more first temporal tiles (e.g., 1-hour 3D tiles) (e.g., as shown in FIG. 3A and FIG. 3B). For example, the one or more second temporal tiles (e.g., 1-day 3D tiles) correspond to a temporal dimension associated with a second temporal width (e.g., 1 day). As an example, the one or more second temporal tiles (e.g., 1-day 3D tiles) correspond to the first spatial dimension (e.g., x coordinate) and the second spatial dimension (e.g., y coordinate). In one example, the first spatial dimension (e.g., x coordinate) is related to the first spatial zoom level (e.g., 1:8000). As an example, the second spatial dimension (e.g., y coordinate) is related to the second spatial zoom level (e.g., 1:8000). In certain examples, the tile generator 504 is configured to send the one or more second temporal tiles (e.g., 1-day 3D tiles) to the data storage 106 to be stored for retrieval by the client device 108. In some examples, in response to a zoom request from the mapping application 112, one or more tiles of the one or more second temporal tiles stored in the data storage 106 are send to the client device 108. In certain examples, the tile generator 504 is configured to send the one or more second temporal tiles (e.g., 1-day 3D tiles) to the tile generator 506 to generate one or more third temporal tiles (e.g., 1-week 3D tiles).

According to some embodiments, the tile generator 506 is configured to receive the one or more second temporal tiles (e.g., 1-day 3D tiles) from the tile generator 504. In some examples, the tile generator 506 is configured to generate the one or more third temporal tiles (e.g., 1-week 3D tiles) based at least in part on the one or more second temporal tiles (e.g., 1-day 3D tiles) (e.g., as shown in FIG. 3A and FIG. 3B). For example, the one or more third temporal tiles (e.g., 1-week 3D tiles) correspond to a temporal dimension associated with a third temporal width (e.g., 1 week). As an example, the one or more third temporal tiles (e.g., 1-week 3D tiles) correspond to the first spatial dimension (e.g., x coordinate) and the second spatial dimension (e.g., y coordinate). In one example, the first spatial dimension (e.g., x coordinate) is related to the first spatial zoom level (e.g., 1:8000). As an example, the second spatial dimension (e.g., y coordinate) is related to the second spatial zoom level (e.g., 1:8000). In certain examples, the tile generator 506 is configured to send the one or more third temporal tiles (e.g., 1-week 3D tiles) to the data storage 106 to be stored for retrieval by the client device 108. In some examples, in response to a zoom request from the mapping application 112, one or more tiles of the one or more third temporal tiles stored in the data storage 106 are send to the client device 108. In certain examples, the tile generator 506 is configured to send the one or more third temporal tiles (e.g., 1-week 3D tiles) to the tile generator 508 to generate one or more fourth temporal tiles (e.g., 1-month 3D tiles).

According to certain embodiments, the tile generator 508 is configured to receive the one or more third temporal tiles (e.g., 1-week 3D tiles) from the tile generator 506. In some examples, the tile generator 508 is configured to generate the one or more fourth temporal tiles (e.g., 1-month 3D tiles) based at least in part on the one or more third temporal tiles (e.g., 1-week 3D tiles) (e.g., as shown in FIG. 3A and FIG. 3B). For example, the one or more fourth temporal tiles (e.g., 1-month 3D tiles) correspond to a temporal dimension associated with a fourth temporal width (e.g., 1 month). As an example, the one or more fourth temporal tiles (e.g., 1-month 3D tiles) correspond to the first spatial dimension (e.g., x coordinate) and the second spatial dimension (e.g., y coordinate). In one example, the first spatial dimension (e.g., x coordinate) is related to a first spatial zoom level (e.g., 1:8000). As an example, the second spatial dimension (e.g., x coordinate) is related to a second spatial zoom level (e.g., 1:8000). In certain examples, the tile generator 508 is configured to send the one or more fourth tiles (e.g., 1-month 3D tiles) to the data storage 106 to be stored for retrieval by the client device 108. In some examples, in response to a zoom request from the mapping application 112, one or more tiles of the one or more fourth temporal tiles stored in the data storage 106 are send to the client device 108.

In some embodiments, the tile generator 508 is configured to send the one or more fourth temporal tiles (e.g., 1-month 3D tiles) to one or more other tile generators to generate one or more additional temporal tiles. In some examples, the temporal widths of the additional temporal tiles are different from the first temporal width, the second temporal width, the third temporal width and the fourth temporal widths of the tiles generated by tile generators 112, 504, 506, 508. In certain examples, in response to a zoom request from the mapping application 112, one or more tiles of the one or more additional temporal tiles stored in the data storage 106 are send to the client device 108.

In certain embodiments, a request (e.g., zoom request) from the client device 108 includes a requested temporal width. In some examples, in response to the request, one tile from one or more temporal tiles stored in the data storage 106 is selected. For example, the selected tile is associated with a selected temporal width equal to the first temporal width, the second temporal width, the third temporal width, the fourth temporal width or the temporal width of the one or more additional temporal tiles stored in the data storage 106. In certain examples, the selected temporal width is equal to the requested temporal width.

Figure 6:
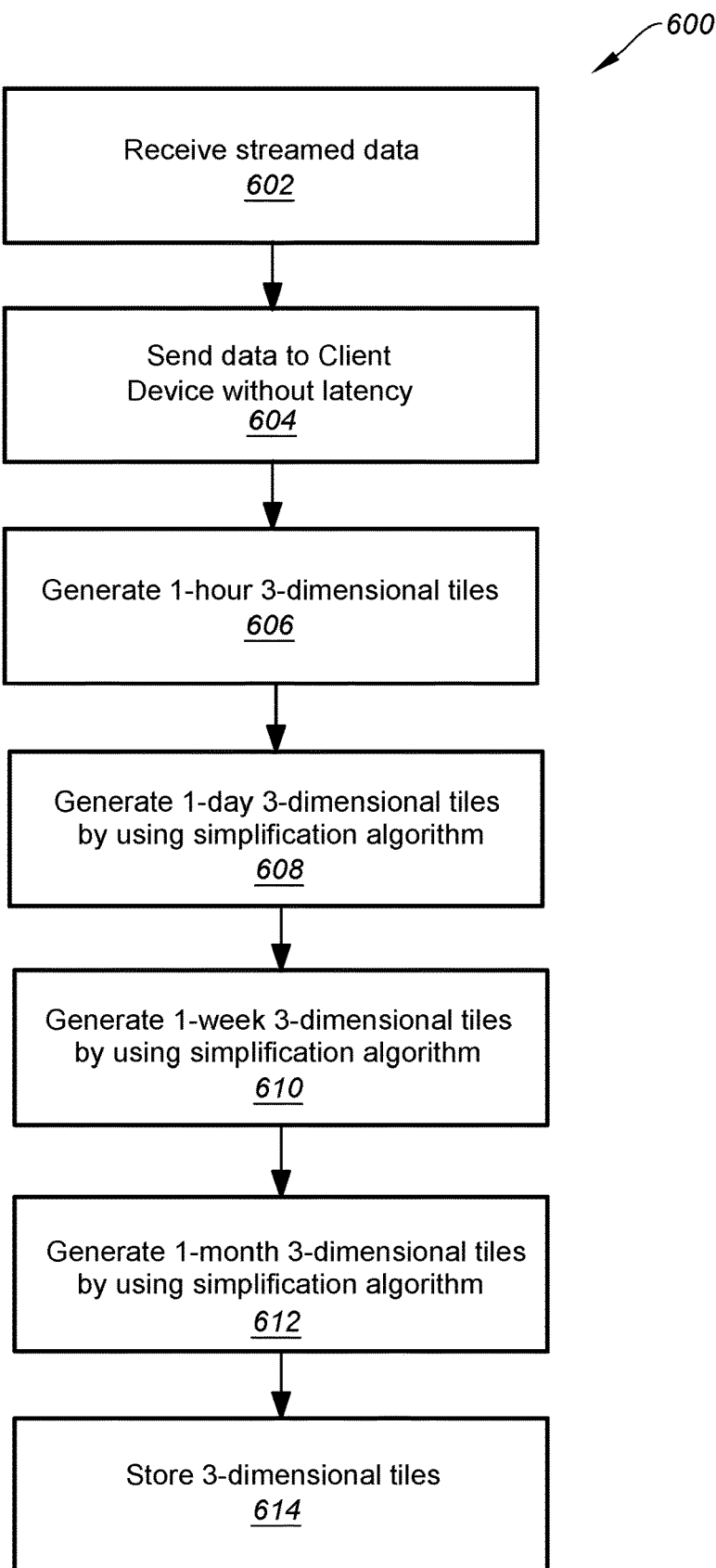
FIG. 6 is a simplified diagram showing a method for processing and displaying time-related geospatial data according to one embodiment of the present invention.

FIG. 6 is a simplified diagram showing a method 600 for processing and displaying time-related geospatial data according to one embodiment of the present invention. This diagram is merely an example, which should not unduly limit the scope of the claims. One of ordinary skill in the art would recognize many variations, alternatives, and modifications.

The method 600 includes process 602 for receiving streamed data and process 604 for sending data to the client device 108 without latency. The method 600 further includes process 606 for generating one or more first temporal tiles associated with a first temporal width, process 608 for generating one or more second temporal tiles associated with a second temporal width, process 610 for generating one or more third temporal tiles associated with a third temporal width, and process 612 for generating one or more fourth temporal tiles associated with a fourth temporal width. The method 600 further includes process 614 for storing the generated temporal tiles. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 600 are performed by the system 100. In certain embodiments, some or all processes (e.g., steps) of the method 600 are performed by the system 500. In certain examples, some or all processes (e.g., steps) of the method 600 are performed by a computer and/or a processor directed by a code. For example, a computer includes a server computer and/or a client computer (e.g., a smartphone). In some examples, some or all processes (e.g., steps) of the method 600 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone, and/or a server rack). As an example, instructions included by a non-transitory computer-readable medium are executed by a processor including a processor of a server computer and/or a processor of a client computer (e.g., a smartphone, and/or server rack).

According to some embodiments, at the process 602, data is received from one or more data sources. In some examples, the received data includes temporal information and geospatial information for each data object of one or more data objects. For example, the temporal information includes timestamps of the received data. In one example, the geospatial information includes geographic coordinates of the received data. In some examples, at the process 604, the received data is sent without latency to the client device 108 (e.g., as shown in FIG. 1, FIG. 2 and FIG. 5).

In some embodiments, at the process 606, one or more first temporal tiles (e.g., 1-hour 3D tiles) are generated (e.g., as shown in FIG. 1, FIG. 2, FIG. 4A and FIG. 5). In some examples, the one or more first temporal tiles (e.g., 1-hour 3D tiles) corresponds to a temporal dimension associated with a first temporal width (e.g., 1 hour). In certain examples, the one or more first temporal tiles are associated with two spatial dimensions (e.g., x coordinate and y coordinate). For example, first spatial dimension (e.g., x coordinate) relates to a first spatial zoom level (1:8000). In one example, the second spatial dimension (e.g., y coordinate) relates to a second spatial zoom level (1:8000). As an example, the spatial dimensions correspond to geographic coordinates of the received data. According to some examples, the one or more first temporal tiles are generated based at least in part on the temporal information and the geospatial information for each data object of one or more data objects included in the received data.

In certain embodiments, at the process 608, one or more second temporal tiles (e.g., 1-day 3D tiles) are generated by using a simplification algorithm (e.g., as shown in FIG. 3A, FIG. 4B and FIG. 5). In some examples, the one or more second temporal tiles (e.g., 1-day 3D tiles) corresponds to a temporal dimension associated with a second temporal width (e.g., 1 day). In certain examples, the one or more second temporal tiles are associated with two spatial dimensions (e.g., x coordinate and y coordinate). For example, second spatial dimension (e.g., x coordinate) relates to a second spatial zoom level (1:8000). In one example, the second spatial dimension (e.g., y coordinate) relates to a second spatial zoom level (1:8000). As an example, the spatial dimensions correspond to geographic coordinates of the received data. According to some examples, the one or more second temporal tiles are generated based at least in part on the temporal information and the geospatial information for each data object of one or more data objects included in the received data.

Figure 4C:
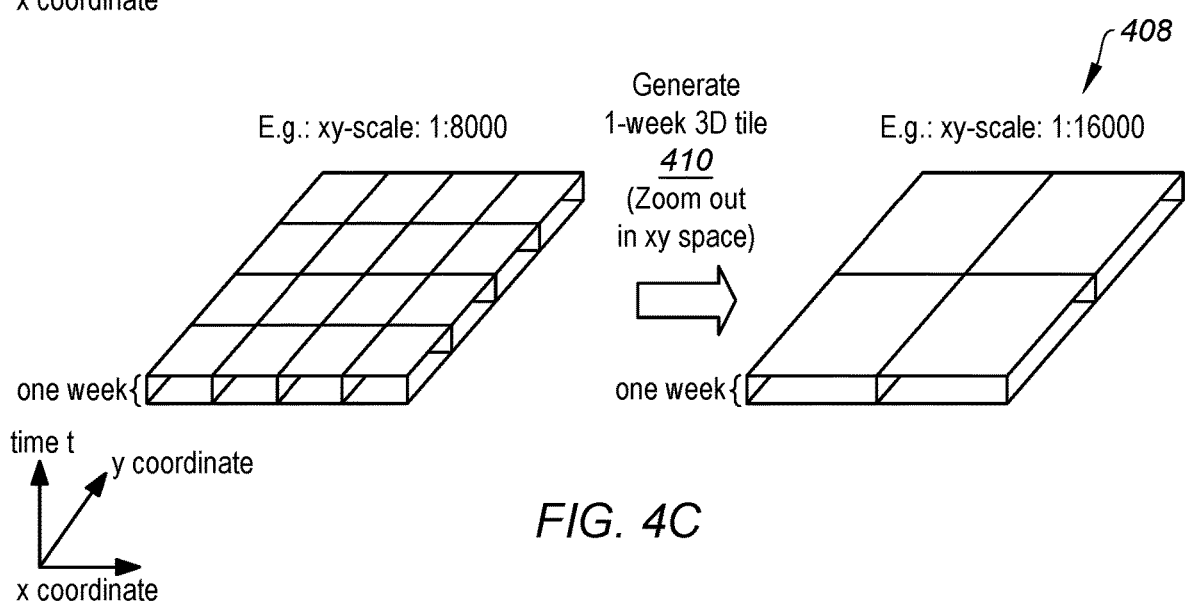
FIG. 4C is a simplified diagram showing a method for generating temporal tiles according to one embodiment of the present invention.

According to some embodiments, at the process 610, one or more third temporal tiles (e.g., 1-week 3D tiles) are generated by using a simplification algorithm (e.g., as shown in FIG. 3B, FIG. 4C and FIG. 5). In some examples, the one or more third temporal tiles (e.g., 1-week 3D tiles) corresponds to a temporal dimension associated with a third temporal width (e.g., 1 week). In certain examples, the one or more third temporal tiles are associated with two spatial dimensions (e.g., x coordinate and y coordinate). For example, third spatial dimension (e.g., x coordinate) relates to a third spatial zoom level (1:8000). In one example, the second spatial dimension (e.g., y coordinate) relates to a second spatial zoom level (1:8000). As an example, the spatial dimensions correspond to geographic coordinates of the received data. According to some examples, the one or more third temporal tiles are generated based at least in part on the temporal information and the geospatial information for each data object of one or more data objects included in the received data.

According to certain embodiments, at the process 612, one or more fourth temporal tiles (e.g., 1-month 3D tiles) are generated by using a simplification algorithm (e.g., as shown in FIG. 5). In some examples, the one or more fourth temporal tiles (e.g., 1-month 3D tiles) corresponds to a temporal dimension associated with a fourth temporal width (e.g., 1 month). In certain examples, the one or more fourth temporal tiles are associated with two spatial dimensions (e.g., x coordinate and y coordinate). For example, fourth spatial dimension (e.g., x coordinate) relates to a fourth spatial zoom level (1:8000). In one example, the second spatial dimension (e.g., y coordinate) relates to a second spatial zoom level (1:8000). As an example, the spatial dimensions correspond to geographic coordinates of the received data. According to some examples, the one or more fourth temporal tiles are generated based at least in part on the temporal information and the geospatial information for each data object of one or more data objects included in the received data.

As discussed above and further emphasized here, FIG. 6 is merely an example, which should not unduly limit the scope of the claims. One of ordinary skill in the art would recognize many variations, alternatives, and modifications. In some examples, the first temporal tiles, the second temporal tiles, the third temporal tiles, and/or the fourth temporal tiles include multi-dimensional tiles. In certain examples, one dimension of the multi-dimensional tiles corresponds to a temporal dimension associated with a particular temporal width. As an example, the temporal width of the multi-dimensional tile is determined based on the temporal information included in the received data. In one example, two dimensions of the multi-dimensional tile correspond to spatial dimensions associated with spatial zoom levels. As an example, the spatial zoom levels are determined based on the geospatial information included in the received data.

Figure 7A:
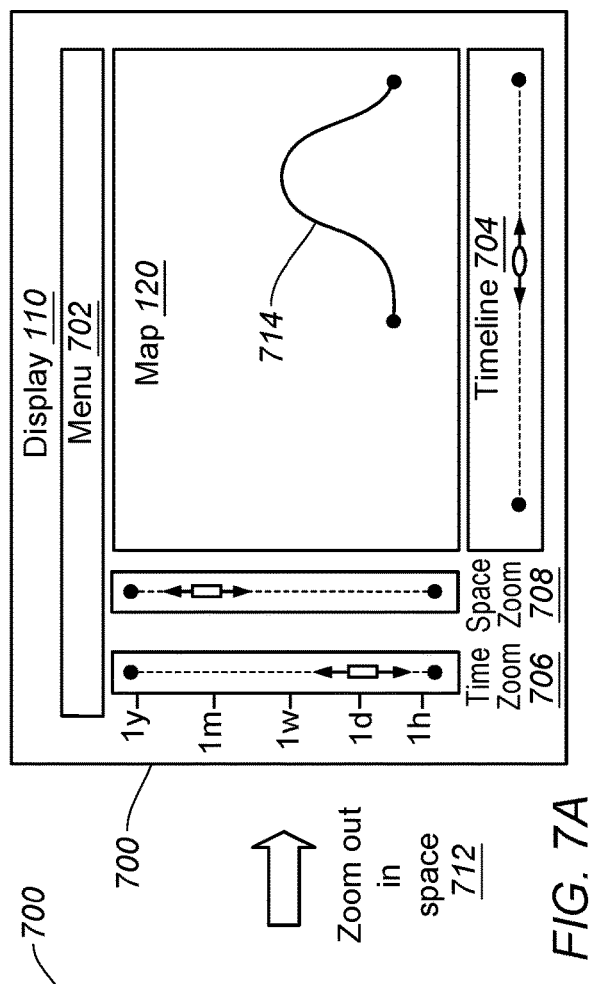
FIG. 7A is a simplified diagram showing a user interface for displaying time-related geospatial data according to one embodiment of the present invention

FIG. 7A is a simplified diagram showing a user interface 700 for displaying time-related geospatial data according to one embodiment of the present invention. This diagram is merely an example, which should not unduly limit the scope of the claims. One of ordinary skill in the art would recognize many variations, alternatives, and modifications. The user interface 700 includes the display 110, the map 120, a menu 702, a timeline slider 704, a time zoom slider 706, and a space zoom slider 708. For example, a timeline 710 on the map 120 includes temporal locations of the data object during a particular time interval in relation to the geographic area displayed on the map 120. As an example, the locations of the data object indicate the movement of the data object within the particular time interval. In one example, the timeline 710 includes the starting location, intermediate locations and the ending location of the data object during the particular time interval. In some examples, the timeline slider 704 is configured to a user to change the time interval with respect to time to a new time interval. For example, the timeline 710 on the map 120 includes temporal locations of the data object during the new time interval.

In some embodiments, the space zoom slider 708 is configured to allow the user to change the spatial zoom level of the map 120. For example, the displayed map 120 corresponds to a first temporal zoom level (e.g., 1 day) and a first spatial zoom level (e.g., 1:8000). In some examples, in response to sliding the space zoom slider 708 upward on the user interface 700, the first spatial zoom level (e.g., 1:8000) is changed 712 to a second spatial zoom level (e.g., 1:16000). For example, in response to changing the spatial zoom level, the timeline 710 changes to a spatially zoomed-out timeline 714. In certain examples, the temporal zoom level (e.g., 1 day) of map 120 is not changed. In some examples, in response to changing the spatial zoom level, the client device 108 sends a request (e.g., spatial zoom request) to the application server 102 to retrieve one or more temporal tiles stored in the data storage 106. For example, the request (e.g., spatial zoom request) includes a requested spatial zoom level corresponding to the second spatial zoom level (e.g., 1:16000). In some examples, in response to the request, one tile from one or more temporal tiles stored in the data storage 106 is selected. For example, the selected tile is associated with a selected spatial zoom level equal to the second spatial zoom level (e.g., 1:16000). In certain examples, the selected spatial zoom level is equal to the requested spatial zoom level. In some example, the mapping application 118 receives the selected tile to generate the map 120 at the second spatial zoom level (e.g., 1:16000). For example, the mapping application 118 renders the map 120 based at least in part on the received tiles.

Figure 7B:
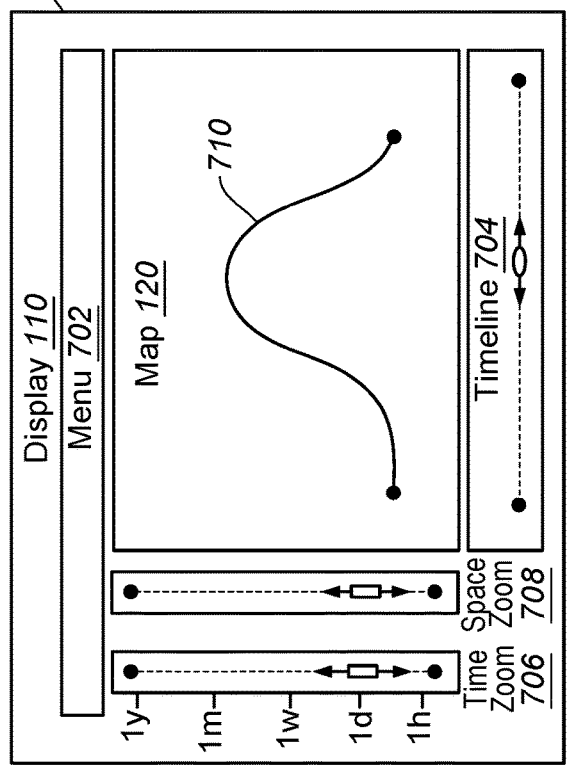
FIG. 7B is a simplified diagram showing a user interface for displaying time-related geospatial data according to one embodiment of the present invention

FIG. 7B is a simplified diagram showing the user interface 700 for displaying time-related geospatial data according to one embodiment of the present invention. This diagram is merely an example, which should not unduly limit the scope of the claims. One of ordinary skill in the art would recognize many variations, alternatives, and modifications. The user interface 700 includes the display 110, the map 120, a menu 702, a timeline slider 704, a time zoom slider 706, and a space zoom slider 708. For example, the timeline 714 on the map 120 includes temporal locations of the data object during a particular time interval in relation to the geographic area displayed on the map 120. As an example, the locations of the data object indicate the movement of the data object within the particular time interval. In one example, the timeline 714 includes the starting location, intermediate locations and the ending location of the data object during the particular time interval. In some examples, the timeline slider 704 is configured to a user to change the time interval with respect to time to a new time interval. For example, the timeline 714 on the map 120 includes temporal locations of the data object during the new time interval.

In some embodiments, the time zoom slider 706 is configured to allow the user to change the temporal zoom level of the map 120. For example, the displayed map 120 corresponds to the first temporal zoom level (e.g., 1 day) and the second spatial zoom level (e.g., 1:16000). In some examples, in response to sliding the time zoom slider 708 upward on the user interface 700, the first temporal zoom level (e.g., 1 day) is changed 716 to a second temporal zoom level (e.g., 1 week). For example, in response to changing the temporal zoom level, the timeline 714 changes to a temporally zoomed-out timeline 718. In certain examples, the spatial zoom level (e.g., 1:16000) of map 120 is not changed. In some examples, in response to changing the temporal zoom level, the client device 108 sends a request (e.g., temporal zoom request) to the application server 102 to retrieve one or more temporal tiles stored in the data storage 106. For example, the request (e.g., temporal zoom request) includes a requested temporal width corresponding to the second temporal zoom level (e.g., 1 week). In some examples, in response to the request, one tile from one or more temporal tiles stored in the data storage 106 is selected. For example, the selected tile is associated with a selected temporal width equal to the second temporal zoom level (e.g., 1 week). In certain examples, the selected temporal width is equal to the requested temporal width. In some example, the mapping application 118 receives the selected tile to generate the map 120 at the second temporal zoom level (e.g., 1 week). For example, the mapping application 118 renders the map 120 based at least in part on the received tiles.

As discussed above and further emphasized here, FIG. 7A and FIG. 7B are merely examples, which should not unduly limit the scope of the claims. One of ordinary skill in the art would recognize many variations, alternatives, and modifications. In some examples, the one or more temporal tiles of the map 120 include one or more multi-dimensional tiles. In certain examples, one dimension of the multi-dimensional tiles corresponds to a temporal dimension associated with a particular temporal width (e.g., 1 day). In some examples, two dimensions of the multi-dimensional tiles corresponds to a first spatial dimension and a second spatial dimension. For example, the first spatial dimension is associated with a first spatial zoom level (e.g., 1:8000). As an example, the second spatial dimension is associated with a second spatial zoom level (e.g., 1:8000).

Figure 8:
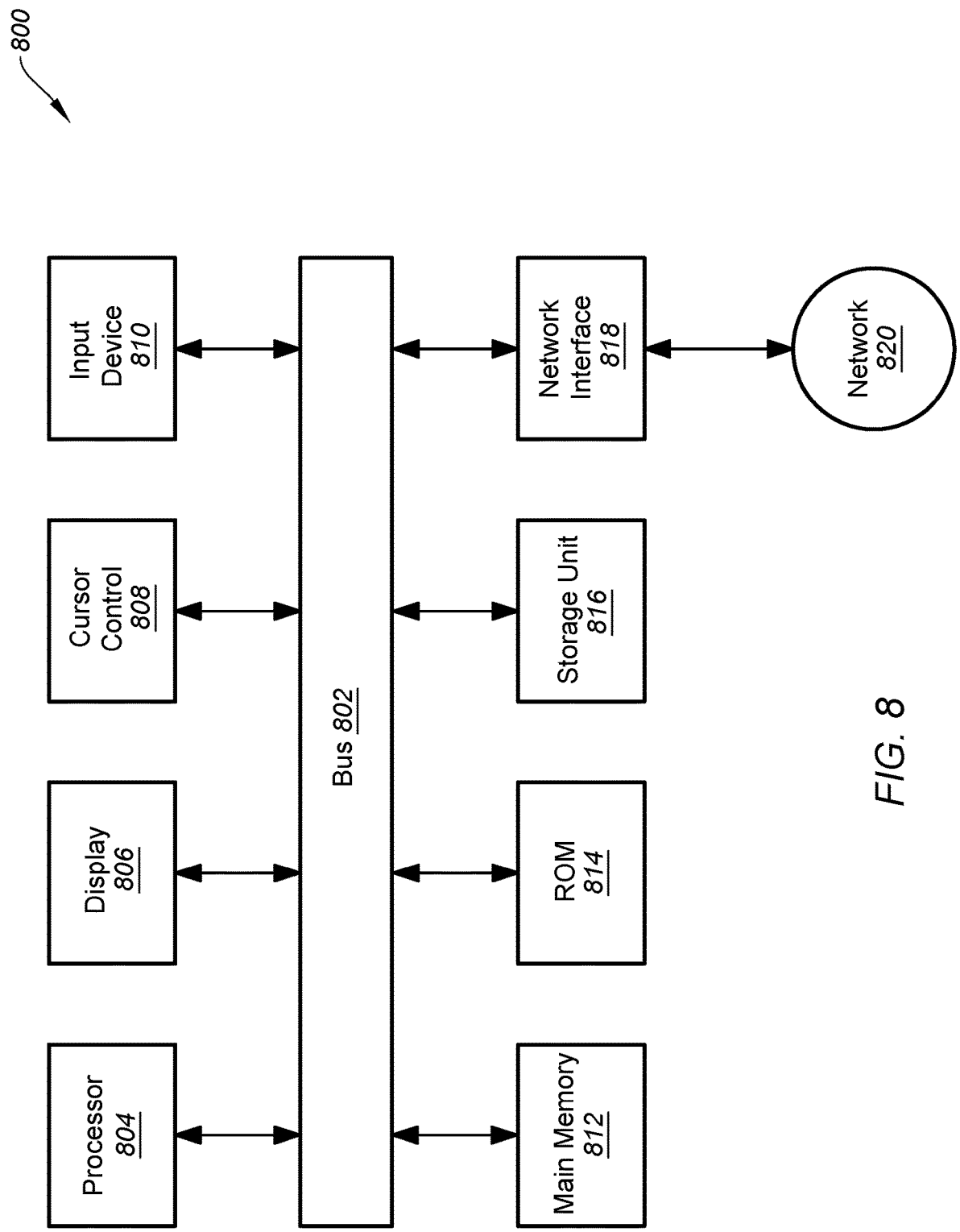
FIG. 8 is a simplified diagram showing a computing system for implementing a system for processing and displaying time-related geospatial data according to one embodiment of the present invention.

FIG. 8 is a simplified diagram showing a computing system for implementing a system for processing and displaying time-related geospatial data according to one embodiment of the present invention. This diagram is merely an example, which should not unduly limit the scope of the claims. One of ordinary skill in the art would recognize many variations, alternatives, and modifications. The computing system 800 includes a bus 802 or other communication mechanism for communicating information, a processor 804, a display 806, a cursor control component 808, an input device 810, a main memory 812, a read only memory (ROM) 814, a storage unit 816, and a network interface 818. In some embodiments, some or all processes (e.g., steps) of the method 200, the method 300, the method 304, the method 400, the method 404, the method 408 and/or the method 600 are performed by the computing system 800. In some examples, the bus 802 is coupled to the processor 804, the display 806, the cursor control component 808, the input device 810, the main memory 812, the read only memory (ROM) 814, the storage unit 816, and/or the network interface 818. In certain examples, the network interface is coupled to a network 820. For example, the processor 804 includes one or more general purpose microprocessors. In some examples, the main memory 812 (e.g., random access memory (RAM), cache and/or other dynamic storage devices) is configured to store information and instructions to be executed by the processor 804. In certain examples, the main memory 812 is configured to store temporary variables or other intermediate information during execution of instructions to be executed by processor 804. For examples, the instructions, when stored in the storage unit 816 accessible to processor 804, render the computing system 800 into a special-purpose machine that is customized to perform the operations specified in the instructions. In some examples, the ROM 808 is configured to store static information and instructions for the processor 804. In certain examples, the storage unit 816 (e.g., a magnetic disk, optical disk, or flash drive) is configured to store information and instructions.

In some embodiments, the display 806 (e.g., a cathode ray tube (CRT), an LCD display, or a touch screen) is configured to display information to a user of the computing system 800. In some examples, the input device 810 (e.g., alphanumeric and other keys) is configured to communicate information and commands to the processor 804. For example, the cursor control 808 (e.g., a mouse, a trackball, or cursor direction keys) is configured to communicate additional information and commands (e.g., to control cursor movements on the display 806) to the processor 804.

According to some embodiments, a method for processing time-related geospatial data from one or more data sources includes: receiving data including temporal information and geospatial information for each data object of one or more data objects, sending the data to a client device to display the data on a map, and generating one or more first multi-dimensional tiles based at least in part on the temporal information and the geospatial information. The one or more first multi-dimensional tiles correspond to a temporal dimension associated with a first temporal width. The method further includes storing the one or more first multi-dimensional tiles in a storage for retrieval by the client device. The method is performed using one or more processors. For example, the method is implemented according to at least FIG. 1, FIG. 2, FIG. 5, and/or FIG. 6.

In some examples, the method includes generating one or more second multi-dimensional tiles based at least in part on the one or more first multi-dimensional tiles. The one or more second multi-dimensional tiles correspond to the temporal dimension associated with a second temporal width. The method further includes storing the one or more second multi-dimensional tiles in the storage for retrieval by the client device. The first temporal width is smaller than the second temporal width. In certain examples, the first temporal width is equal to 1 hour, and the second temporal width is equal to 1 day. In some examples, the sending the data to a client device to display the data on a map includes sending the data to the client device without latency in response to receiving the data.

In certain examples, the method includes generating the map based at least in part on one tile of the one or more first multi-dimensional tiles. In some examples, the sending the data to a client device to display the data on a map includes sending the data to the client device to generate the map based at least in part on one tile of the one or more first multi-dimensional tiles. In certain examples, the one or more first multi-dimensional tiles include one or more three-dimensional tiles.

In some examples, the one or more three-dimensional tiles are associated with the temporal dimension, a first spatial dimension, and a second spatial dimension. The first spatial dimension is related to a first spatial zoom level. The second spatial dimension is related to a second spatial zoom level. The first spatial dimension and the second spatial dimension are different. In certain examples, the first spatial zoom level and the second spatial zoom level are the same. In some examples, the first spatial zoom level and the second spatial zoom level are both equal to 1:8000.

In some examples, the first spatial dimension is related to one or more latitude coordinates, and the second spatial dimension is related to one or more longitude coordinates. In certain examples, the first temporal width is a predetermined width. In certain examples, the one or more first multi-dimensional tiles include multiple first multi-dimensional tiles. The generating one or more second multi-dimensional tiles based at least in part on the one or more first multi-dimensional tiles includes generating one tile of the one or more second multi-dimensional tiles based at least in part on the multiple first multi-dimensional tiles. The multiple first multi-dimensional tiles include first data represented by a first number of data points, and the one tile of the one or more second multi-dimensional tiles includes second data represented by a second number of data points. In some examples, the first number of data points is equal to the second number of data points.

In certain examples, the generating one tile of the one or more second multi-dimensional tiles based at least in part on the multiple first multi-dimensional tiles includes using a simplification algorithm to convert the first data to the second data. In some examples, the simplification algorithm includes one selected from a group consisting of a Ramer-Douglas-Peucker algorithm, a Visvalingam-Whyatt algorithm, a Reuman-Witkam algorithm, a Opheim algorithm, a Lang algorithm, and a Zhao-Saalfeld algorithm. In certain examples, the multiple first multi-dimensional tiles include 24 multi-dimensional tiles. Each tile of the 24 multi-dimensional tiles correspond to a different hour of a particular day in time, and the one tile of the one or more second multi-dimensional tiles corresponds to the particular day.

In some examples, the method includes: receiving a request from the client device, the request including a requested temporal width, and selecting one tile from the one or more first multi-dimensional tiles and the one or more second multi-dimensional tiles. The selected tile is associated with a selected temporal width equal to the first temporal width or the second temporal width. The selected temporal width is equal to the requested temporal width.

According to certain embodiments, a system for processing time-related geospatial data from one or more data sources includes an application server and a storage. The application server is configured to: receive data including temporal information and geospatial information for each data object of one or more data objects, send the data to a client device to display the data on a map, and generate one or more first multi-dimensional tiles based at least in part on the temporal information and the geospatial information. The one or more first multi-dimensional tiles correspond to a temporal dimension associated with a first temporal width. The application server is further configured to send the one or more first multi-dimensional tiles to store in the storage for retrieval by the client device. For example, the method is implemented according to at least FIG. 1, FIG. 2, FIG. 5, and/or FIG. 6.

In some examples, the application server is further configured to generate one or more second multi-dimensional tiles based at least in part on the one or more first multi-dimensional tiles. The one or more second multi-dimensional tiles correspond to the temporal dimension associated with a second temporal width. The application server is further configured to store the one or more second multi-dimensional tiles in the storage for retrieval by the client device. The first temporal width is smaller than the second temporal width.

In certain examples, the one or more first multi-dimensional tiles include multiple first multi-dimensional tiles. The application server is further configured to generate one tile of the one or more second multi-dimensional tiles based at least in part on the multiple first multi-dimensional tiles. The multiple first multi-dimensional tiles include first data represented by a first number of data points, and the one tile of the one or more second multi-dimensional tiles includes second data represented by a second number of data points. The application server is further configured to use a simplification algorithm to convert the first data to the second data.

In some examples, the application server is further configured to receive a request from the client device. The request includes a requested temporal width. The application server is further configured to select one tile from the one or more first multi-dimensional tiles and the one or more second multi-dimensional tiles. The selected tile is associated with a selected temporal width equal to the first temporal width or the second temporal width. The selected temporal width is equal to the requested temporal width.

In certain examples, the application server is further configured to send the data to the client device to generate the map based at least in part on one tile of the one or more first multi-dimensional tiles. In some examples, the one or more first multi-dimensional tiles include one or more three-dimensional tiles. The one or more three-dimensional tiles are associated with the temporal dimension, a first spatial dimension, and a second spatial dimension. The first spatial dimension is related to a first spatial zoom level, and the second spatial dimension is related to a second spatial zoom level. The first spatial dimension and the second spatial dimension are different. In certain examples, the application server is further configured to send the data to the client device without latency in response to receiving the data.

According to some embodiments, a system for displaying time-related geospatial data from one or more data sources includes one or more processors and a memory storing instructions. The instructions, when executed by the one or more processors, cause the system to perform: receiving data including temporal information and geospatial information for each data object of one or more data objects, displaying the data on a map, and requesting one or more first multi-dimensional tiles corresponding to a temporal dimension associated with a first temporal width. The one or more first multi-dimensional tiles are generated based at least in part on the temporal information and the geospatial information and stored in a storage. The instructions, when executed by the one or more processors, cause the system to further perform receiving the one or more first multi-dimensional tiles. For example, the method is implemented according to at least FIG. 1, FIG. 2, FIG. 5, and/or FIG. 6.

In some examples, the instructions, when executed by the one or more processors, cause the system to further perform requesting one or more second multi-dimensional tiles corresponding to the temporal dimension associated with a second temporal width. The one or more second multi-dimensional tiles are generated based at least in part on the one or more first multi-dimensional tiles and stored in the storage. The first temporal width is smaller than the second temporal width.

In certain examples, the one or more first multi-dimensional tiles include multiple first multi-dimensional tiles. The multiple first multi-dimensional tiles include first data represented by a first number of data points, and one tile of the one or more second multi-dimensional tiles includes second data represented by a second number of data points. The instructions, when executed by the one or more processors, cause the system to further perform requesting the one tile of the one or more second multi-dimensional tiles. The one tile is generated based at least in part on the multiple first multi-dimensional tiles and the first data is converted to the second data by using a simplification algorithm.

In some examples, the instructions, when executed by the one or more processors, cause the system to further perform: sending a request including a requested temporal width, and receiving one tile. The one tile is selected from the one or more first multi-dimensional tiles and the one or more second multi-dimensional tiles. The selected tile is associated with a selected temporal width equal to the first temporal width or the second temporal width. The selected temporal width is equal to the requested temporal width.

In certain examples, the instructions, when executed by the one or more processors, cause the system to further perform generating the map based at least in part on one tile of the one or more first multi-dimensional tiles. In certain examples, the one or more first multi-dimensional tiles include one or more three-dimensional tiles. The one or more three-dimensional tiles are associated with the temporal dimension, a first spatial dimension, and a second spatial dimension. The first spatial dimension is related to a first spatial zoom level, and the second spatial dimension is related to a second spatial zoom level. The first spatial dimension and the second spatial dimension are different.

In some examples, the instructions, when executed by the one or more processors, cause the system to further perform receiving the data from an application server configured to send the data to a client device without latency.

According to certain embodiments, a method for displaying time-related geospatial data from one or more data sources includes: receiving data including temporal information and geospatial information for each data object of one or more data objects, displaying the data on a map, and requesting one or more first multi-dimensional tiles corresponding to a temporal dimension associated with a first temporal width. The one or more first multi-dimensional tiles are generated based at least in part on the temporal information and the geospatial information and stored in a storage. The method further includes receiving the one or more first multi-dimensional tiles. The method is performed using one or more processors. For example, the method is implemented according to at least FIG. 1, FIG. 2, FIG. 5, and/or FIG. 6.

In some examples, the method further includes requesting one or more second multi-dimensional tiles corresponding to the temporal dimension associated with a second temporal width. The one or more second multi-dimensional tiles are generated based at least in part on the one or more first multi-dimensional tiles and stored in the storage. The first temporal width is smaller than the second temporal width.

In certain examples, the one or more first multi-dimensional tiles include multiple first multi-dimensional tiles. The multiple first multi-dimensional tiles include first data represented by a first number of data points, and one tile of the one or more second multi-dimensional tiles includes second data represented by a second number of data points. The method further includes requesting the one tile of the one or more second multi-dimensional tiles. The one tile is generated based at least in part on the multiple first multi-dimensional tiles and the first data is converted to the second data by using a simplification algorithm.

In some examples, the method further includes: sending a request including a requested temporal width, and receiving one tile. The one tile is selected from the one or more first multi-dimensional tiles and the one or more second multi-dimensional tiles. The selected tile is associated with a selected temporal width equal to the first temporal width or the second temporal width. The selected temporal width is equal to the requested temporal width.

In certain examples, the method further includes generating the map based at least in part on one tile of the one or more first multi-dimensional tiles. In certain examples, the one or more first multi-dimensional tiles include one or more three-dimensional tiles. The one or more three-dimensional tiles are associated with the temporal dimension, a first spatial dimension, and a second spatial dimension. The first spatial dimension is related to a first spatial zoom level, and the second spatial dimension is related to a second spatial zoom level. The first spatial dimension and the second spatial dimension are different.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for processing time-related geospatial data from one or more data sources, the system comprising:
   an application server; and
   wherein the application server is configured to:
      receive data including temporal information and geospatial information for each data object of one or more data objects;
      send the data to a client device to display the data on a map;
      receive a request from the client device, the request including an indicated temporal width;
      generate a plurality of multi-dimensional tiles based at least in part on the temporal information and the geospatial information, the plurality of multi-dimensional tiles corresponding to a temporal dimension associated with a first temporal width and a second temporal width different from the first temporal width;
      select a tile from the plurality of multi-dimensional tiles, the selected tile being associated with a selected temporal width, wherein the selected temporal width is equal to the indicated temporal width, and the selected temporal width is equal to one of the first temporal width or the second temporal width; and
      cause to present the selected tile as a map to the client device.

2. The system of claim 1, wherein the plurality of multi-dimensional tiles are a plurality of first multi-dimensional tiles; and
   wherein the application server is further configured to:
      generate one or more second multi-dimensional tiles based at least in part on the plurality of first multi-dimensional tiles, the one or more second multi-dimensional tiles corresponding to the temporal dimension associated with the second temporal width; and
      provide the one or more second multi-dimensional tiles to the client device by storing the one or more second multi-dimensional tiles to a data repository accessible by the client device or transmitting the one or more second multi-dimensional tiles to the client device.

3. The system of claim 2 wherein:
   the plurality of first multi-dimensional tiles include first data represented by a first number of data points; and
   the one or more second multi-dimensional tiles includes second data represented by a second number of data points;
   wherein the application server is further configured to use a simplification algorithm to convert the first data to the second data.

4. The system of claim 3, wherein the first number of data points of the first data are distributed based on a first data rate, and the second number of data points of the second data are distributed based on a second data rate different from the first data rate.

5. The system of claim 1, wherein the plurality of multi-dimensional tiles include at least one selected from a group consisting of:
   one or more first multi-dimensional tiles associated with the first temporal width;
   one or more second multi-dimensional tiles associated with the second temporal width; and
   one or more third multi-dimensional tiles associated with a third temporal width;
   wherein the first temporal width, the second temporal width, and the third temporal width are different from each other;
   wherein the one or more second multi-dimensional tiles or the one or more third multi-dimensional tiles are generated using a simplification algorithm.

6. The system of claim 1 wherein:
   the plurality of multi-dimensional tiles include one or more three-dimensional tiles;
   the one or more three-dimensional tiles are associated with the temporal dimension, a first spatial dimension, and a second spatial dimension;
   the first spatial dimension is related to a first spatial zoom level; and
   the second spatial dimension is related to a second spatial zoom level;
   wherein the first spatial dimension and the second spatial dimension are different.

7. The system of claim 1 wherein the application server is further configured to send the data to the client device without latency in response to receiving the data.

8. A system for displaying time-related geospatial data from one or more data sources, the system comprising:
   one or more processors; and
   a memory storing instructions, the instructions, when executed by the one or more processors, causing the system to perform operations comprising:
      receiving data including temporal information and geospatial information for each data object of one or more data objects;
      displaying the data on a map;
      sending a request including an indicated temporal width;
      requesting a plurality of multi-dimensional tiles corresponding to a temporal dimension associated with a first temporal width and a second temporal width different from the first temporal width, the plurality of multi-dimensional tiles being generated based at least in part on the temporal information and the geospatial information;

receiving a tile selected from the plurality of multi-dimensional tiles, the selected tile being associated with a selected temporal width, wherein the selected temporal width is equal to the indicated temporal width, and the selected temporal width is equal to one of the first temporal width or the second temporal width; and presenting the selected tile as a map.

9. The system of claim 8, wherein the plurality of multi-dimensional tiles are a plurality of first multi-dimensional tiles, and wherein the operations further comprise:

requesting one or more second multi-dimensional tiles corresponding to the temporal dimension associated with the second temporal width, the one or more second multi-dimensional tiles being generated based at least in part on the plurality of first multi-dimensional tiles.

10. The system of claim 9, wherein:

the plurality of first multi-dimensional tiles include first data represented by a first number of data points; and one tile of the one or more second multi-dimensional tiles includes second data represented by a second number of data points;

wherein the first data is converted to the second data using a simplification algorithm.

11. The system of claim 10, wherein the first number of data points of the first data are distributed based on a first rate, and the second number of data points of the second data are distributed based on a second rate different from the first rate.

12. The system of claim 8, wherein the plurality of multi-dimensional tiles include at least one selected from a group consisting of:

one or more first multi-dimensional tiles associated with the first temporal width;

one or more second multi-dimensional tiles associated with the second temporal width; and one or more third multi-dimensional tiles associated with a third temporal width;

wherein the first temporal width, the second temporal width, and the third temporal width are different from each other;

wherein the one or more second multi-dimensional tiles or the one or more third multi-dimensional tiles are generated using a simplification algorithm.

13. The system of claim 8 wherein:

the plurality of multi-dimensional tiles include one or more three-dimensional tiles;

the one or more three-dimensional tiles are associated with the temporal dimension, a first spatial dimension, and a second spatial dimension;

the first spatial dimension is related to a first spatial zoom level; and the second spatial dimension is related to a second spatial zoom level;

wherein the first spatial dimension and the second spatial dimension are different.

14. The system of claim 8 wherein the operations further comprise receiving the data from an application server without latency.

15. A method for displaying time-related geospatial data from one or more data sources, the method comprising:

receiving data including temporal information and geospatial information for each data object of one or more data objects;

displaying the data on a map;

sending a request including an indicated temporal width;

requesting a plurality of multi-dimensional tiles corresponding to a temporal dimension associated with a first temporal width and a second temporal width different from the first temporal width, the plurality of multi-dimensional tiles being generated based at least in part on the temporal information and the geospatial information;

receiving a tile selected from the plurality of multi-dimensional tiles, the selected tile being associated with a selected temporal width, wherein the selected temporal width is equal to the indicated temporal width, and the selected temporal width is equal to one of the first temporal width or the second temporal width; and presenting the selected tile as a map;

wherein the method is performed using one or more processors.

16. The method of claim 15, wherein the plurality of multi-dimensional tiles are a plurality of first multi-dimensional tiles, and further comprising:

requesting one or more second multi-dimensional tiles corresponding to the temporal dimension associated with the second temporal width, the one or more second multi-dimensional tiles being generated based at least in part on the plurality of first multi-dimensional tiles.

17. The method of claim 16 wherein:

the plurality of first multi-dimensional tiles include first data represented by a first number of data points; and one tile of the one or more second multi-dimensional tiles includes second data represented by a second number of data points;

the first data is converted to the second data using a simplification algorithm.

18. The method of claim 17, wherein the first number of data points of the first data are distributed based on a first data rate, and the second number of data points of the second data are distributed based on a second data rate different from the first data rate.

19. The method of claim 15, wherein the plurality of multi-dimensional tiles include at least one selected from a group consisting of:

one or more first multi-dimensional tiles associated with the first temporal width;

one or more second multi-dimensional tiles associated with the second temporal width; and one or more third multi-dimensional tiles associated with a third temporal width;

wherein the first temporal width, the second temporal width, and the third temporal width are different from each other;

wherein the one or more second multi-dimensional tiles or the one or more third multi-dimensional tiles are generated using a simplification algorithm.

20. The method of claim 15 wherein:

the plurality of multi-dimensional tiles include one or more three-dimensional tiles;

the one or more three-dimensional tiles are associated with the temporal dimension, a first spatial dimension, and a second spatial dimension;

the first spatial dimension is related to a first spatial zoom level; and the second spatial dimension is related to a second spatial zoom level.

* * * * *